(12) United States Patent
Maeda et al.

(10) Patent No.: US 9,778,857 B2
(45) Date of Patent: Oct. 3, 2017

(54) RECORDING DEVICE, ACCESS DEVICE, RECORDING SYSTEM, AND RECORDING METHOD

(71) Applicant: Panasonic Intellectual Property Management Co., Ltd., Osaka (JP)

(72) Inventors: Takuji Maeda, Osaka (JP); Masayuki Toyama, Osaka (JP); Hirokazu So, Kyoto (JP)

(73) Assignee: Panasonic Intellectual Property Management Co., Ltd, Osaka (JP)

( * ) Notice: Subject to any disclaimer, the term of this patent is extended or adjusted under 35 U.S.C. 154(b) by 13 days.

(21) Appl. No.: 14/611,784

(22) Filed: Feb. 2, 2015

(65) Prior Publication Data
US 2015/0149690 A1 May 28, 2015

Related U.S. Application Data

(63) Continuation of application No. PCT/JP2013/002592, filed on Apr. 12, 2013.

(30) Foreign Application Priority Data

Aug. 7, 2012 (JP) .................................. 2012-174661

(51) Int. Cl.
*G06F 12/00* (2006.01)
*G06F 3/06* (2006.01)
(Continued)

(52) U.S. Cl.
CPC ............ *G06F 3/0613* (2013.01); *G06F 3/064* (2013.01); *G06F 3/0659* (2013.01);
(Continued)

(58) Field of Classification Search
CPC ...... G06F 3/0613; G06F 3/064; G06F 3/0659; G06F 3/0679; H04N 5/907
(Continued)

(56) References Cited

U.S. PATENT DOCUMENTS

| 5,530,673 A | 6/1996 | Tobita et al. |
| 8,549,213 B2 | 10/2013 | So et al. |

(Continued)

FOREIGN PATENT DOCUMENTS

| JP | H07-028690 A | 1/1995 |
| JP | 2003-331586 A | 11/2003 |

(Continued)

OTHER PUBLICATIONS

IPRP for corresponding International Application No. PCT/JP2013/002529 dated Feb. 19, 2015.
(Continued)

*Primary Examiner* — Mardochee Chery
(74) *Attorney, Agent, or Firm* — Renner, Otto, Boisselle, & Sklar, LLP

(57) ABSTRACT

A recording device operates in accordance with an instruction from an access device. The recording device comprising a nonvolatile memory that stores data, a communication unit that receives an instruction issued by the access device, and a memory controller that controls the nonvolatile memory. When a recording instruction for recording data into the nonvolatile memory is received from the access device, the memory controller starts recording of data into the nonvolatile memory. When the memory controller receives from the access device a suspension instruction for suspending the recording of data, the memory controller stores suspension information into the nonvolatile memory, the suspension information indicating a suspended position as a position in a recording area of the nonvolatile memory at which the data is being recorded upon reception of the suspension instruction.

6 Claims, 17 Drawing Sheets

(51) Int. Cl.
*H04N 5/907* (2006.01)
*H04N 5/91* (2006.01)

(52) U.S. Cl.
CPC ........... *G06F 3/0679* (2013.01); *H04N 5/907* (2013.01); *H04N 5/91* (2013.01)

(58) Field of Classification Search
USPC ........................................................ 711/102
See application file for complete search history.

(56) References Cited

U.S. PATENT DOCUMENTS

| | | |
|---|---|---|
| 2007/0067598 A1 | 3/2007 | Fujimoto |
| 2007/0162707 A1 | 7/2007 | So et al. |
| 2011/0213915 A1 | 9/2011 | So et al. |

FOREIGN PATENT DOCUMENTS

| | | |
|---|---|---|
| JP | 2005-292926 A | 10/2005 |
| JP | 2006178923 A | 7/2006 |
| JP | 2011-210235 A | 10/2011 |
| WO | WO 2005/055064 A1 | 6/2005 |

OTHER PUBLICATIONS

International Search Report for corresponding International Application No. PCT/JP2013/002529 dated May 28, 2013.
Form PCT/ISA/237 for corresponding International Application No. PCT/JP2013/002529 dated May 28, 2013.
Japanese Office Action for corresponding Japanese Patent Application No. 2014-529247 dated Aug. 23, 2016. No English language translation.

Fig. 4
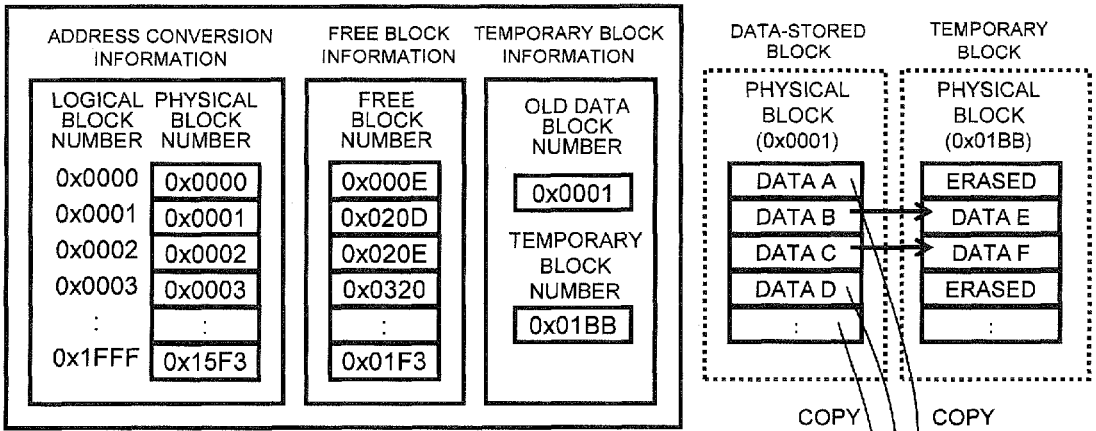
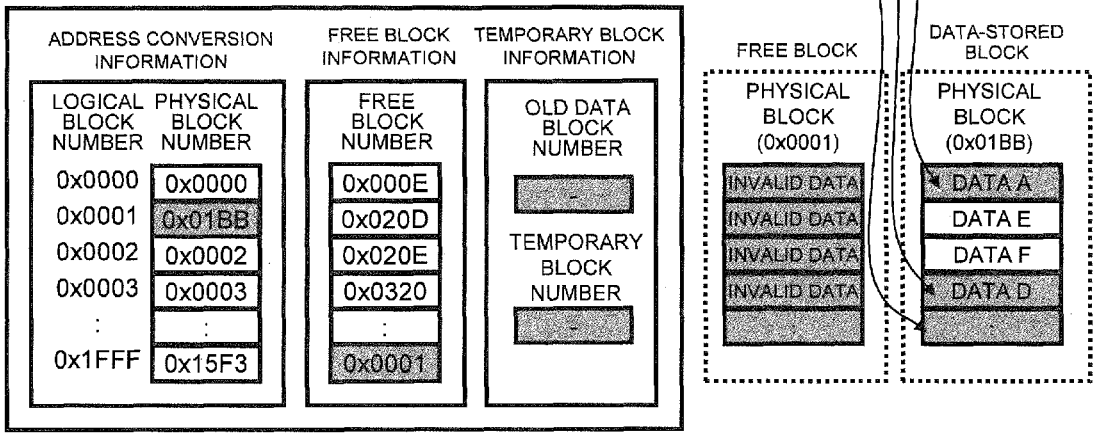
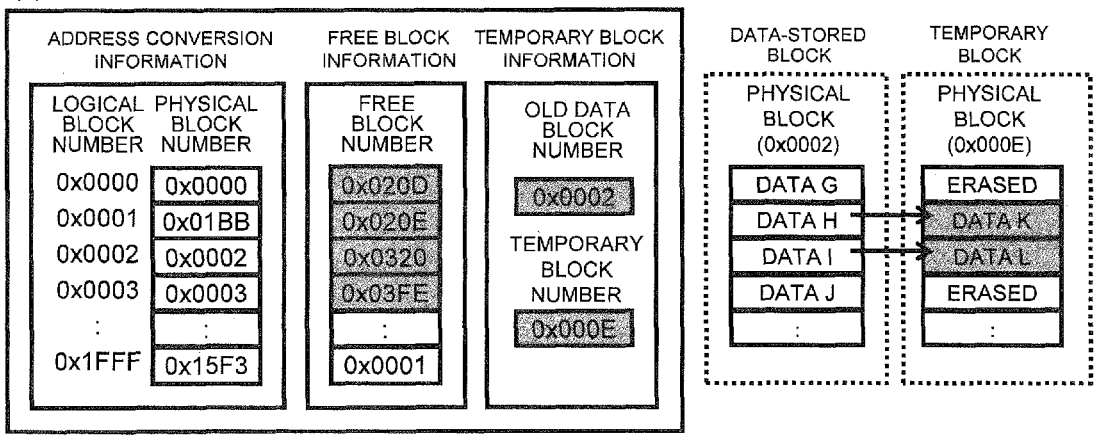

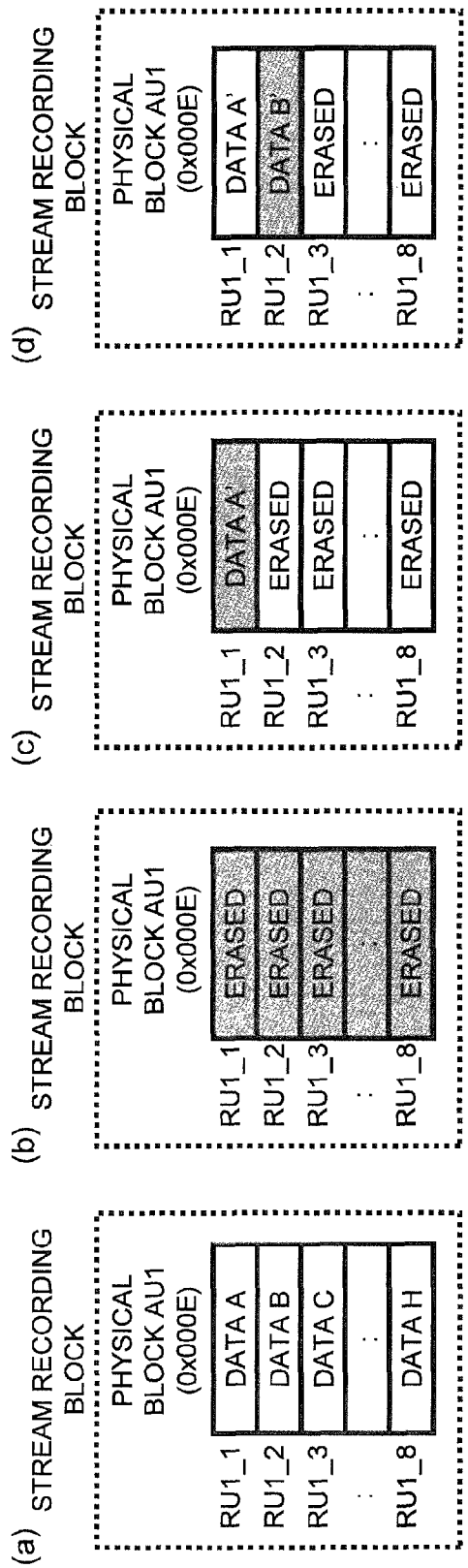

SUSPENDED ADDRESS INFORMATION REGISTER

| RESISTOR ADDRESS | FIELD NAME | CONTENT |
|---|---|---|
| 0x0000-0x0003 | SUSPENDED ADDRESS 1 | FIRST STREAM RECORDING SUSPENDED ADDRESS (LOGICAL SECTOR NUMBER) |
| 0x0004-0x0007 | SUSPENDED ADDRESS 2 | SECOND STREAM RECORDING SUSPENDED ADDRESS (LOGICAL SECTOR NUMBER) |
| 0x0008-0x000B | SUSPENDED ADDRESS 3 | THIRD STREAM RECORDING SUSPENDED ADDRESS (LOGICAL SECTOR NUMBER) |
| : | : | : |
| 0x001C-0x001F | SUSPENDED ADDRESS 8 | EIGHTH STREAM RECORDING SUSPENDED ADDRESS (LOGICAL SECTOR NUMBER) |

(b)

SUSPENDED ADDRESS INFORMATION REGISTER

| RESISTOR ADDRESS | FIELD NAME | CONTENT |
|---|---|---|
| 0x0000-0x0003 | SUSPENDED ADDRESS | STREAM RECORDING SUSPENDED ADDRESS (LOGICAL SECTOR NUMBER) OF "TARGET SLOT"-TH STREAM |
| 0x0004-0x0007 | TARGET SLOT | SLOT NUMBER RELATED TO STREAM RECORDING SUSPENDED ADDRESS INDICATED IN SUSPENDED ADDRESS |

(c)

SUSPENDED ADDRESS INFORMATION REGISTER

| RESISTOR ADDRESS | FIELD NAME | CONTENT |
|---|---|---|
| 0x0000-0x0003 | SUSPENDED ADDRESS | ONE OF REGISTERED STREAM RECORDING SUSPENDED ADDRESSES (LOGICAL SECTOR NUMBER) |

STREAM MANAGEMENT INFORMATION — 224

| STREAM MANAGEMENT NUMBER | LOGICAL SECTOR NUMBER | LOGICAL BLOCK NUMBER | PHYSICAL BLOCK NUMBER |
|---|---|---|---|
| 1 | 0x4400 | 0x0002 | 0x0002 |
| 2 | 0x6800 | 0x0003 | 0x0003 |
| 3 | UNREGISTERED | UNREGISTERED | UNREGISTERED |
| .. | .. | .. | .. |

SUSPENDED ADDRESS INFORMATION REGISTER

| RESISTOR ADDRESS | FIELD NAME | VALUE |
|---|---|---|
| 0x0000-0x0003 | SUSPENDED ADDRESS | 0x00004400 |

(b)

STREAM MANAGEMENT INFORMATION — 224

| STREAM MANAGEMENT NUMBER | LOGICAL SECTOR NUMBER | LOGICAL BLOCK NUMBER | PHYSICAL BLOCK NUMBER |
|---|---|---|---|
| 1 | 0x6800 | 0x0003 | 0x0003 |
| 2 | UNREGISTERED | UNREGISTERED | UNREGISTERED |
| 3 | UNREGISTERED | UNREGISTERED | UNREGISTERED |
| .. | .. | .. | .. |

SUSPENDED ADDRESS INFORMATION REGISTER

| RESISTOR ADDRESS | FIELD NAME | VALUE |
|---|---|---|
| 0x0000-0x0003 | SUSPENDED ADDRESS | 0x00006800 |

(c)

STREAM MANAGEMENT INFORMATION — 224

| STREAM MANAGEMENT NUMBER | LOGICAL SECTOR NUMBER | LOGICAL BLOCK NUMBER | PHYSICAL BLOCK NUMBER |
|---|---|---|---|
| 1 | UNREGISTERED | UNREGISTERED | UNREGISTERED |
| 2 | UNREGISTERED | UNREGISTERED | UNREGISTERED |
| 3 | UNREGISTERED | UNREGISTERED | UNREGISTERED |
| .. | .. | .. | .. |

SUSPENDED ADDRESS INFORMATION REGISTER

| RESISTOR ADDRESS | FIELD NAME | VALUE |
|---|---|---|
| 0x0000-0x0003 | SUSPENDED ADDRESS | 0xFFFFFFFF |

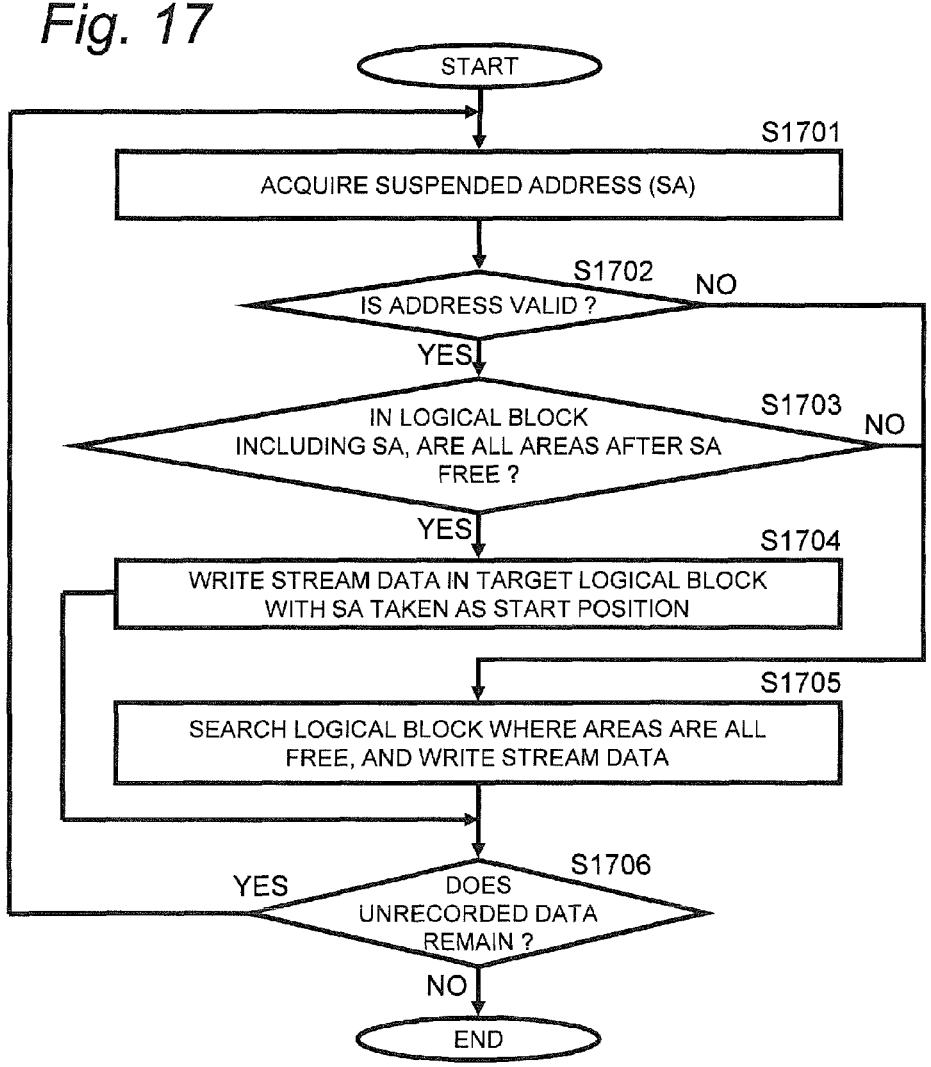

RECORDING DEVICE, ACCESS DEVICE, RECORDING SYSTEM, AND RECORDING METHOD

CROSS-REFERENCE TO RELATED APPLICATIONS

This is a continuation application of International Application No. PCT/JP2013/002529, with an international filing date of Apr. 12, 2013, which claims priority of Japanese Patent Application No. 2012-174661 filed on Aug. 7, 2012, the contents of which are incorporated herein by reference.

TECHNICAL FIELD

The present disclosure relates to a recording device that stores data into a nonvolatile memory, an access device that accesses the recording device, and a recording system provided with the recording device and the access device.

BACKGROUND ART

There exist various kinds of recording mediums for recording digital data like music content and video data, such as a magnetic disk, an optical disk and a magneto-optical disk. Among these recording mediums, there is known a memory card using a semiconductor memory such as a flash ROM as a storage device. Since reduction in size of the recording medium is realized, the memory card using the semiconductor memory has rapidly spread in use mainly for small-sized portable equipment such as a digital still camera and a mobile phone terminal. Further, the semiconductor memory has come to be used in applications as a storage built in equipment, as well as in applications as a detachable removable medium such as the conventional memory card. For example, by building a semiconductor memory such as a flash ROM in equipment, the semiconductor memory is used in place of a hard disk.

As such a memory card and a storage built in equipment, a semiconductor device called a NAND flash memory has been mainly used. The NAND flash memory is a storage device where already recorded data is once erased and thereafter another data can be recorded again. The NAND flash memory can constitute a recording device that can be overwritten a plurality of times, as can the conventional hard disk.

FIG. 2 is a diagram showing a configuration of the NAND flash memory. The NAND flash memory includes a plurality of physical blocks. The physical block is a unit at the time of erasing data recorded in the NAND flash memory. The NAND flash memory has characteristics that data cannot be directly overwritten and that recorded data has to be once erased in units of physical blocks without fail at the time of data writing.

This physical block includes a plurality of pages. The page is a unit at the time of reading data from and writing data into the NAND flash memory. The page includes a data part and a redundant part. The data part is an area accessible from the access device as a logical address space, and is an area where file data and the like are actually stored.

The redundant part is an area where management information, an ECC and the like of the recording device having the NAND flash memory is recorded, and is an area not accessible from the access device. For example, the size of the data part is about 4 KB, and the size of the redundant part is about 128 bytes. Further, the size of the physical block in the case of focusing only on the data part is about the order of 4 MB, for example. Therefore, the capacity of the NAND flash memory made up of 8192 physical blocks each having this size is 32 GB.

With the NAND flash memory having the foregoing characteristics, when the recording device is to carry out data writing in the NAND flash memory in smaller units than the physical block size, it is necessity to perform entrainment saving processing for copying valid data existing in the same block into another physical block. For this reason, in the case of writing data in the NAND flash memory in smaller units than the erase units, a recording speed decreases.

At the time of performing real-time recording such as video recording by a movie camera or a DSC, when the recording speed decreases, a speed at which stream data is recorded into the recording device may not catch up with a speed at which the stream data is generated, and the real-time recording may stop. In the video recording by the movie camera or the DSC, there are being recorded precious scenes for the user which cannot be reproduced, such as those of a sport festival or a wedding ceremony, and hence stopping of the real-time recording is a critical problem.

Conventionally, as a method for solving such a problem, there has been provided a method where a data storage area on a recording device is managed in fixed-length block units, and real-time recorded stream data is recorded into a fixed-length block whose free area (=stream data recordable area) has a size equal to or more than a threshold (e.g., Patent Document 1). In this method, since the size of existing valid data included in an area as a target for stream data recording becomes small, overhead of the entrainment saving processing becomes small. As a result, it is possible to prevent the real-time recording from stopping.

Patent Document

Patent Document 1: WO2005/055064

SUMMARY OF INVENTION

In the above conventional technique, when the size of the existing valid data included in each fixed-length block is smaller than the threshold, the block can be used as the target area for stream data recording, thereby to improve the use efficiency of the data storage area at the time of the real-time recording. However, in the above conventional technique, when even just a little existing valid data exists in each fixed-length block, it is necessary to record stream data while copying the existing valid data by way of the entrainment saving processing during the real-time recording. This may make it difficult to operate the recording device at the maximum recording speed.

In contrast, when a fixed-length block not including existing valid data is used as the target area for stream data recording, the entrainment saving processing does not occur during the real-time recording, thereby allowing high-speed recording by the recording device. In this case, however, when even just a little existing valid data is included in each fixed-length block, the stream data cannot be recorded into the block, thus causing deterioration in area use efficiency at the time of the real-time recording. Especially when recording and deletion of data are repeatedly carried out on the recording device and the data in the recording device are thereby dispersed and disposed, the deterioration in area use efficiency is significant.

The present disclosure provides a recording device, an access device, a recording system and a recording method which realize high-speed recording in the case of performing real-time recording on the recording device, and also improve the area use efficiency at the time of the real-time recording.

A recording device of the present disclosure operates in accordance with an instruction from an access device. The recording device includes: a nonvolatile memory that stores data; a communication unit that receives an instruction issued by the access device; and a memory controller that controls the nonvolatile memory. When a recording instruction for recording data into the nonvolatile memory is received from the access device, the memory controller starts recording of data into the nonvolatile memory. Further, when a suspension instruction for suspending the recording of data is received from the access device, the memory controller stores suspension information into the nonvolatile memory, the suspension information indicating a suspended position as a position in a recording area of the nonvolatile memory at which the data is being recorded upon reception of the suspension instruction.

An access device of the present disclosure accesses a recording device including a nonvolatile memory to store data. The access device includes: a recording controller that manages an area in the nonvolatile memory with the area divided into predetermined block length units, searches an unrecorded area in the nonvolatile memory in the predetermined block length units, and records data into an unrecorded block; and a communication unit that transmits/receives data to/from the recording device. The recording controller transmits to the recording device a recording instruction for recording data into the nonvolatile memory, when recording data into the unrecorded block. Further, the recording controller transmits to the recording device a suspension instruction for instructing suspension of the recording of data, when suspending the recording of data in the middle of the unrecorded block.

A recording system of the present disclosure includes: a recording device that includes a nonvolatile memory for storing data; and an access device that accesses the nonvolatile memory. The access device includes: a recording controller that manages an area in the nonvolatile memory with the area divided into predetermined block length units, searches an unrecorded area in the nonvolatile memory in the predetermined block length units, and records data into the unrecorded block; and a first communication unit that transmits/receives data to/from the recording device. The recording device includes: a second communication unit that receives an instruction issued by the access device; and a memory controller that controls the nonvolatile memory. The recording controller of the access device transmits to the recording device a recording instruction for recording data into the nonvolatile memory, when recording data into the unrecorded block. The recording controller of the access device transmits to the recording device a suspension instruction for instructing suspension of the recording of data, when suspending the recording of data in the middle of the unrecorded block. When the memory controller of the recording device receives the recording instruction from the access device, the memory controller of the recording device starts recording of data into the nonvolatile memory. Further, when the memory controller of the recording device receives the suspension instruction from the access device, the memory controller of the recording device stores suspension information into the nonvolatile memory, the suspension information indicating a suspended position as a position in a recording area of the nonvolatile memory at which the data is being recorded upon reception of the suspension instruction.

A recording method of the present disclosure is a recording method where, in a recording system having a recording device that includes a nonvolatile memory for storing data and an access device that accesses the nonvolatile memory, the access device records data into the nonvolatile memory. The recording method includes, in the access device, a step of managing an area in the nonvolatile memory with the area divided into predetermined block length units, searching an unrecorded area in the nonvolatile memory in the predetermined block length units, and recording data into the unrecorded block, and a step of transmitting/receiving data from/to the recording device, and in the recording device, a step of receiving an instruction issued by the access device, and a step of controlling the nonvolatile memory. The recording method further includes, in the access device, a step of transmitting to the recording device a recording instruction for recording data into the nonvolatile memory when recording data into the unrecorded block, and a step of transmitting to the recording device a suspension instruction for instructing suspension of the recording of data when suspending the recording of data in the middle of the unrecorded block, and in the memory controller, a step of starting recording of data into the nonvolatile memory when receiving the recording instruction from the access device, and a step of storing suspension information into the nonvolatile memory when receiving the suspension instruction from the access device, the suspension information indicating a suspended position as a position in a recording area of the nonvolatile memory at which the data is being recorded upon reception of the suspension instruction.

According to an idea of the present disclosure, it is possible to provide a recording device and the like which allow high-speed recording in the case of performing real-time recording on the recording device, and also improve the area use efficiency at the time of the real-time recording.

BRIEF DESCRIPTION OF DRAWINGS

FIG. 4 shows diagrams illustrating one example of address management information and physical blocks in the conventional recording device.

FIG. 11 shows other diagrams illustrating states of physical blocks in the present embodiment.

FIG. 12 shows diagrams illustrating suspended address information in the present embodiment.

FIG. 13 shows diagrams illustrating one example of suspended address information updating processing in a second recording controller in the recording device in the present embodiment.

FIG. 17 is a flowchart showing stream data recording processing in the first recording controller in the case of using third suspended address information in the present embodiment.

DESCRIPTION OF EMBODIMENTS

Hereinafter, as an embodiment of the present disclosure, a recording device, an access device and a recording system will be described with reference to the drawings.

In detailed descriptions, there may be omitted an unnecessary portion out of descriptions concerning the conventional art and substantially the same configuration. This is for simplifying the descriptions.

Further, the following descriptions and the accompanying drawings are disclosed so that a person skilled in the art can fully understand the present disclosure, and are not intended to restrict the subject matter of the claims.

1. Configurations of Access Device and Recording Device

Figure 1:
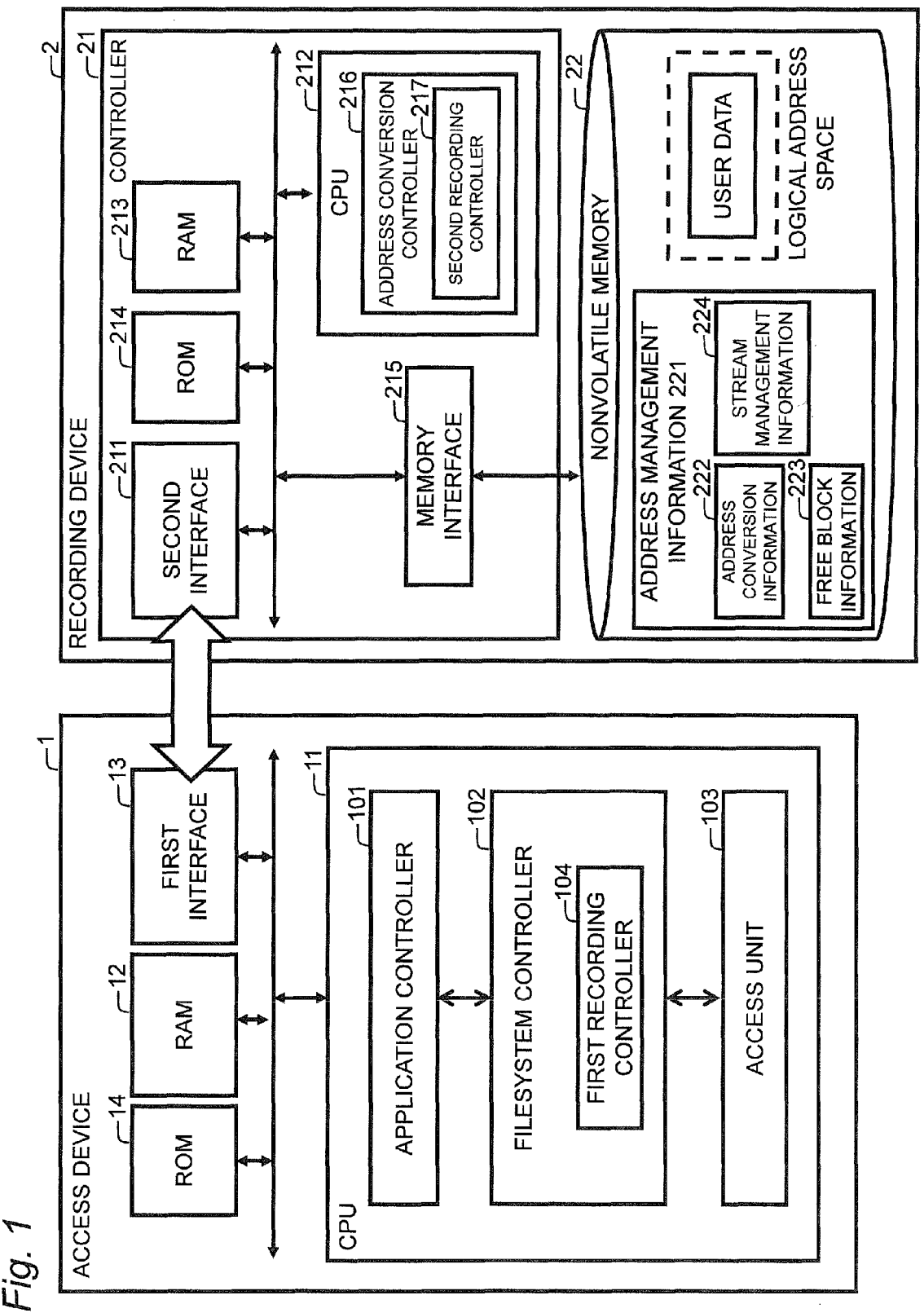
FIG. 1 is a diagram showing a configuration of an access device and a recording device in the present embodiment.
Figure 2:
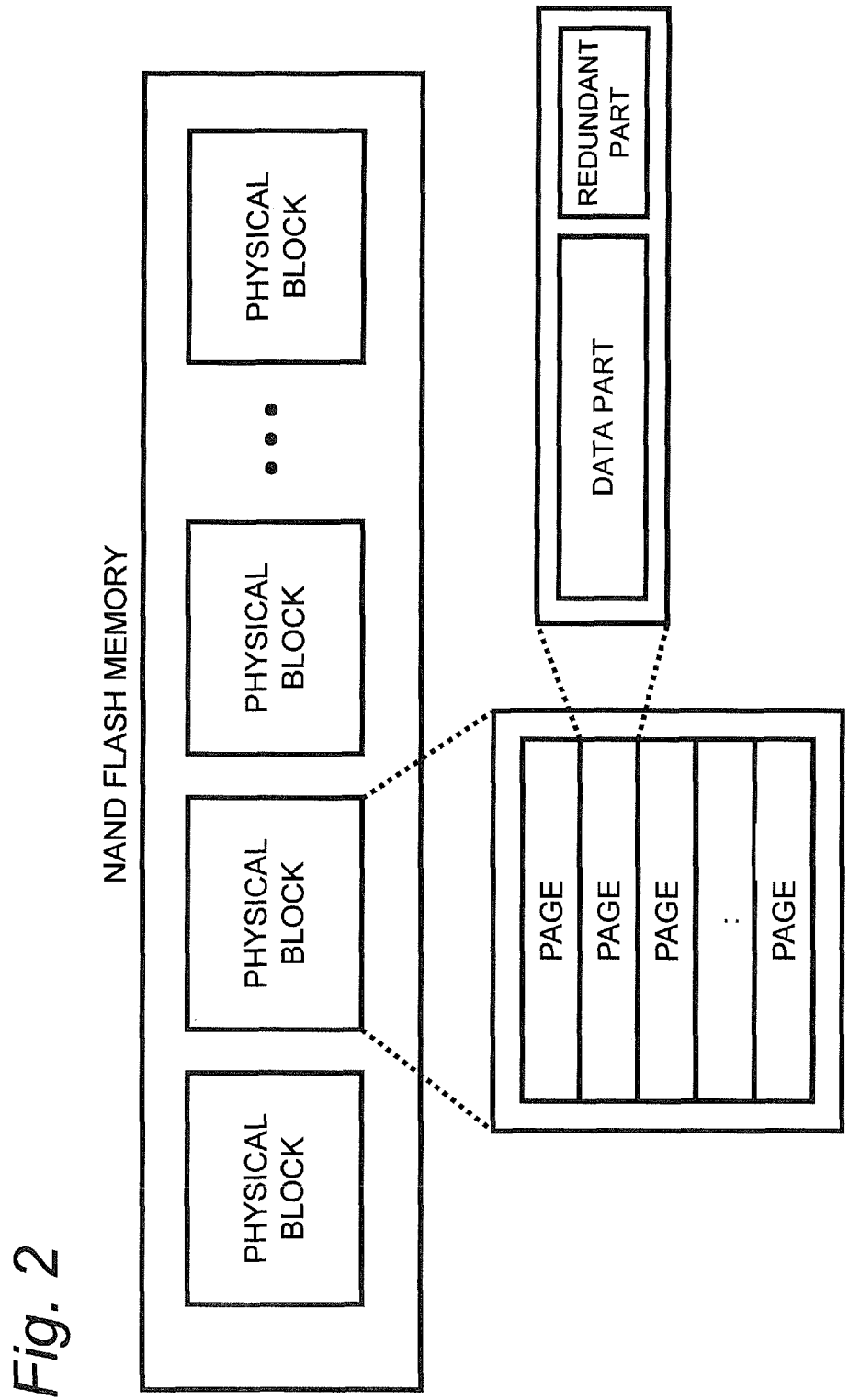
FIG. 2 is a diagram showing a configuration of a NAND flash memory.

FIG. 1 is a constitutional diagram of a recording system including an access device and a recording device in the present embodiment. As shown in FIG. 1, an access device 1 includes a CPU 11, a RAM 12, a first interface 13 and a ROM 14.

A program for controlling the access device 1 is stored in the ROM 14. This program uses the RAM 12 as a temporary storage area, and is executed by the CPU 11.

The first interface 13 is a connection part for connecting between a recording device 2 and the access device 1, and transmits and receives a control signal and data between the recording device 2 and the access device 1.

The CPU 11 includes an application controller 101, a file system controller 102, and an access unit 103. The CPU 11 reads and executes the program stored in the ROM 14, thereby to realize functions of the application controller 101, the file system controller 102 and the access unit 103.

The application controller 101 performs control of the entire access device 1, such as generation of data and control of a power supply.

The file system controller 102 performs control for managing data as a file by means of a file system such as a FAT file system.

The access unit 103 controls transmission and reception of a command and data to and from the recording device 2. For example, the access unit 103 is given a size and an address along with data from the file system controller 102, and records the data with the instructed size into the instructed position in a nonvolatile memory 22 of the recording device 2.

The file system controller 102 further includes a first recording controller 104. The first recording controller 104 is a controller for controlling selection and decision of a recording area and suspension of stream recording at the time of real-time recording, as characteristics of the idea of the present disclosure. The first recording controller 104 does not exist in the conventional access device.

Further, as shown in FIG. 1, the recording device 2 includes a controller 21 and the nonvolatile memory 22.

The controller 21 is a device that performs the entire control of the nonvolatile memory 22. The controller 21 is configured as a system LSI including a CPU and the like. The controller 21 includes a second interface 211, a CPU 212, a RAM 213, a ROM 214 and a memory interface 215.

The second interface 211 is a connection part for connecting between the recording device 2 and the access device 1, and transmits and receives a control signal and data between the recording device 2 and the access device 1 similarly to the first interface 13.

A program for controlling the recording device 2 is stored in the ROM 214. This program uses the RAM 213 as a temporary storage area, and is executed by the CPU 212.

The memory interface 215 is a connection part that connects between the controller 21 and the nonvolatile memory 22, and controls transmission and reception of a command and data to and from the nonvolatile memory 22 between the controller 21 and the nonvolatile memory 22.

The CPU 212 includes an address conversion controller 216 and a second recording controller 217.

The address conversion controller 216 is a controller that controls association between a physical address on the nonvolatile memory 22 and a logical address in a logical address space provided by the recording device 2 as an address space accessible from the access device 1.

The second recording controller 217 is a controller that controls suspension of stream recording as a characteristic of the idea of the present disclosure, and does not exist in the conventional recording device.

The nonvolatile memory 22 stores address management information 221 into an area different from an area for storing user data.

The address management information 221 is information used for address management for a recording area of the nonvolatile memory 22, such as association between a physical address and a logical address. The user data is stored in a logical address space accessible from the access device 1. In contrast, the address management information 221 is stored outside the logical address space so as not to be accessible from the access device 1.

The address management information 221 further includes address conversion information 222 for managing association between a physical address and a logical address, free block information 223 for managing a free physical block (hereinafter, also referred to as "free block"), and stream management information 224 for managing a block under stream-recording. The stream management information 224 is information for managing a block under stream-recording as a characteristic of the present disclosure, and is one not existing in the conventional recording device.

The recording device 2 of the present embodiment stores the stream management information 224 in the nonvolatile memory 22.

Using the stream management information 224 stored in the nonvolatile memory 22, the second recording controller 217 of the recording device 2 controls allocation of a physical block for the stream recording, suspension and resumption of the stream recording, and the like.

Further, the file system controller 102 of the access device 1 in the present embodiment includes the first recording controller 104 that issues to the recording device 2 an instruction for suspending the stream recording, and the like.

By combining the access device 1 and the recording device 2 described above, it is possible to realize high-speed recording by the recording device 2 at the time of performing the real-time recording. Further, by efficiently carrying out suspension and resumption of the real-time recording, it is possible to improve the area use efficiency at the time of the real-time recording.

2. Data Writing Processing in Conventional Recording Device

In order to clarify the characteristics of the idea of the present disclosure, first, data writing processing in the conventional recording device will be described.

Figure 3:
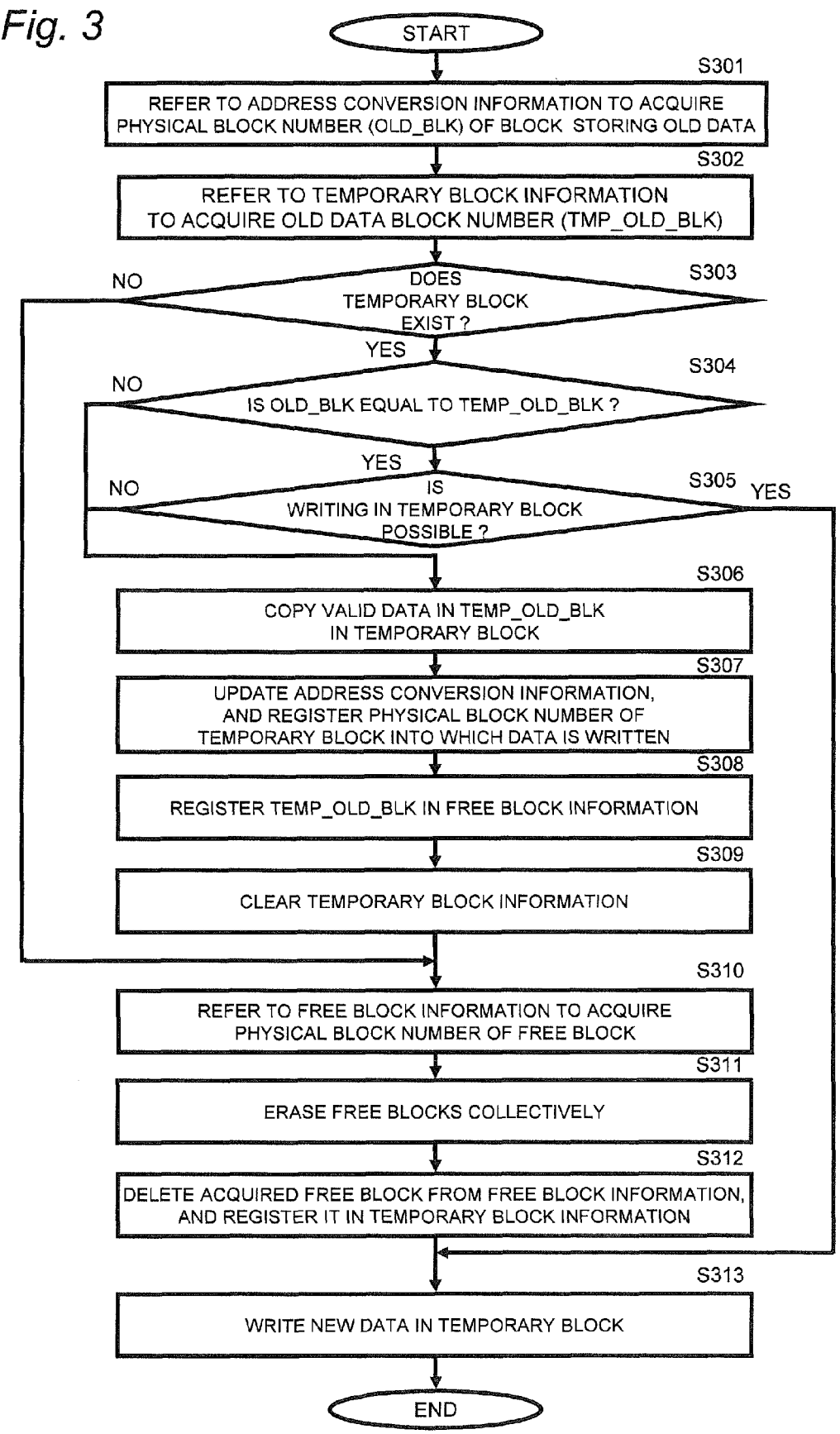
FIG. 3 is a flowchart showing data writing processing in a conventional recording device.

FIG. 3 is a flowchart showing data writing processing in the conventional recording device. FIG. 4 shows diagrams illustrating one example of address management information and physical blocks in the conventional recording device.

As shown in FIG. 4, address management information in the conventional recording device includes address conversion information, free block information and temporary block information. The address conversion information is information for managing association between a logical address and a physical address. The address conversion information is, for example, configured by a table that stores the number of each physical block allocated to a corresponding logical block. The free block information is information for managing the number of an unallocated free physical block. The temporary block information is information for managing a physical block (hereinafter referred to as "temporary block") that is temporarily used for data copying in order to realize data overwriting processing on a NAND flash memory. The temporary block information includes the number of a temporary block and the number of a physical block (hereinafter referred to as "old data block") subjected to the overwriting processing. Further, data that is stored in the old data block and prior to overwriting is referred to as "old data". It is to be noted that in the present disclosure, the number of temporary blocks is one for simplifying the description.

Hereinafter, the data writing processing in the conventional recording device will be described using FIG. 3. Here, as one example, a case is assumed where data K and data L are recorded into areas on a second page and a third page, respectively, of a block with a logical block number 0x0002.

(S301) The recording device refers to the address conversion information, to acquire the number (hereinafter referred to as "OLD_BLK") of a physical block storing old data of the writing target area. In an example of FIG. 4(a), a physical block number of a logical block including the writing target area, which corresponds to the logical block number 0x0002, is 0x0002, and hence OLD_BLK is 0x0002.

(S302) When acquiring OLD_BLK, the recording device refers to the temporary block information, to acquire the number (hereinafter referred to as "TEMP_OLD_BLK") of an old data block. In the example of FIG. 4(a), since an old data block number in the temporary block information is 0x0001, TEMP_OLD_BLK is 0x0001.

Here, the temporary block is a block for realizing pseudo overwriting processing. The temporary block is ensured separately from the physical block storing the old data so that the old data is overwritten on the NAND flash memory. At the time of data recording, the recording device once erases the data in the temporary block, and records new data into the temporary block. Then, the recording device copies valid data, which is in the physical block storing the old data and is other than a portion corresponding to the new data, into the temporary block. This leads to realization of the pseudo overwriting processing on the NAND flash memory.

(S303) The recording device refers to acquired TEMP_OLD_BLK or the number of the temporary block in the temporary block information, thereby to determine whether the temporary block actually exists. For example, when the temporary block does not exist, a number showing an invalid block, such as 0xFFFF, is set to TEMP_OLD_BLK and the temporary block number in the temporary block information. Implementation in such a manner as to indicate non-existence of the temporary block allows determination of the presence of the temporary block. In the example of FIG. 4(a), TEMP_OLD_BLK stores a valid block number (0x0001), thereby indicating existence of the temporary block. When the temporary block exists, the recording device proceeds to processing of Step S304, and when the temporary block does not exist, it proceeds to processing of Step S310.

(S304) When determining that the temporary block exists by the determination processing of Step S303, the recording device determines whether the value of OLD_BLK is equal to the value of TEMP_OLD_BLK. When the values are equal to each other, the recording device proceeds to processing of Step S305, and when the values are not equal to each other, it proceeds to processing of Step S306.

(S305) When determining that the value of OLD_BLK is equal to the value of TEMP_OLD_BLK by the determination processing of Step S304, the recording device determines whether desired data can be written in the temporary block. As one example of the determination method, there can be considered a method where it is determined whether data has already been recorded into a writing target page in the temporary block, and it is determined not to allow writing when data has already been recorded into the writing target page, while it is determined to allow recording when data has not been recorded. In the example of FIG. 4(a), with the data E and the data F having already been recorded into a second page and a third page of the temporary block, respectively, in such a case where overwriting in the areas on these two pages is generated, writing in the temporary block cannot be performed. The recording device proceeds to processing of Step S313 when writing in the temporary block can be performed, and it proceeds to processing of Step S306 when writing in the temporary block cannot be performed.

(S306) When this processing is reached, the current temporary block cannot be used, thus requiring processing for once releasing the temporary block. This processing is generally called entrainment saving processing, or collective processing, of a flash memory, and corresponds to processing from Steps S306 to S309 in the flowchart of FIG. 3. First, the recording device copies valid data of the physical block, indicated by TEMP_OLD_BLK, into an unrecorded area (already erased area) in the temporary block. In the example of FIG. 4(a), all data other than the data B and the data C which are stored in the physical block 0x0001 indicated by TEMP_OLD_BLK are copied into corresponding pages in a physical block 0x01BB as the temporary block.

(S307) Subsequently, the recording device updates the address conversion information, to associate a physical block number of the temporary block with a logical block corresponding to the old data block. In an example of FIG. 4(b), the value of 0x01BB as the physical block number of the temporary block is registered into an area corresponding to the logical block number 0x0001 of the address conversion information.

(S308) Next, the recording device registers the value of TEMP_OLD_BLK into the free block information. In the example of FIG. 4(b), 0x0001 as the value of TEMP_OLD_BLK is added to a tail of the free block information.

(S309) At the end of the entrainment saving processing, the recording device clears the temporary block information. In the example of FIG. 4(b), information in the temporary block information is cleared (made invalid) by setting an invalid block number, or the like. By this entrainment saving processing, the area of the physical block number 0x0001 is changed from the data-stored block to a free block, and the area of the physical block number 0x01BB is changed from the temporary block to a data-stored block. A temporary block does not exist at the point of completion of the entrainment saving processing.

(S310) Next, the recording device carries out temporary block acquiring processing for recording data. In the flowchart of FIG. 3, this temporary block acquiring processing corresponds to processing from Steps S310 to S312. First, the recording device refers to the free block information, to acquire a physical block number registered as a free block. In the example of FIG. 4(b), a free block number 0x000E registered at the head of the free block information is acquired as the number of a recording target block.

(S311) Subsequently, the recording device collectively erases an area of the physical block number (0x000E) acquired in Step S310.

(S312) At the end of the temporary block acquiring processing, the recording device deletes the free block number acquired in Step S310 from the free block information, and registers it into the temporary block information. In an example of FIG. 4(c), the recording device deletes the value of the physical block number 0x000E registered at the head of the free block information from the list of the free block information, and sets the value of 0x000E as a temporary block number of the temporary block information. Further, the recording device sets the value of OLD_BLK acquired in Step S301 as an old data block number of the temporary block information.

(S313) Lastly, the recording device writes desired data into the temporary block. In the example of FIG. 4(c), data K and data L are written into the areas on the second page and the third page of the temporary block, respectively.

In such a manner, at the time of overwriting data, the recording device using the NAND flash memory needs to ensure a temporary block, collectively erase data in the temporary block, record new data, and copy old data into the temporary block. When this data copying processing is performed many times, substantial recording time for new data becomes long, making the recording processing time long, to cause deterioration in performance of the recording device.

Accordingly, in order to realize high-speed recording by the recording device using the NAND flash memory, it is of necessity to reduce this copying processing.

In the present disclosure, there is provided a method of reducing the copying processing in the stream data recording during the real-time recording to allow high-speed recording by the recording device, and also improving the area use efficiency.

3. Address Management Information of Present Embodiment

Figure 5:
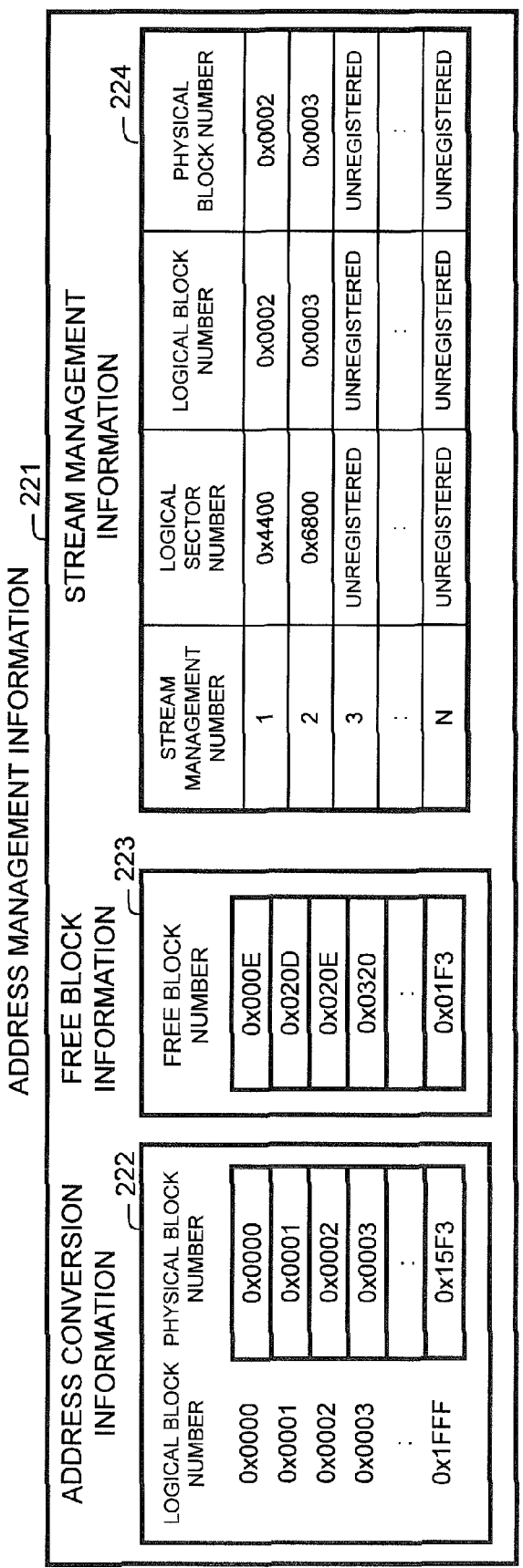
FIG. 5 is a diagram showing a configuration of address management information in the present embodiment.

Referring to FIG. 5, a configuration of the address management information 221 of the present embodiment will be described. As shown in FIG. 5, the address management information 221 of the present embodiment includes the address conversion information 222 and the free block information 223. The address conversion information 222 and the free block information 223 are the same as those included in the conventional address management information described in FIG. 4. The address management information 221 of the present embodiment further includes the stream management information 224. The stream management information 224 is information characteristic of the recording device 2 of the present embodiment, and is information not existing in the conventional recording device.

The stream management information 224 includes a stream management number, a logical sector number, a logical block number, and a physical block number.

At the time of carrying out the stream recording, the recording device 2 of the present embodiment acquires a physical block, the inside of which is entirely a free area, and carries out the stream recording on the acquired physical block. This enables high-speed recording by the recording device.

Further in the recording system of the present embodiment, in the case of suspending the stream recording at the point of carrying it out to the middle of the physical block, the access device 1 transmits a suspension instruction for instructing suspension of the stream recording to the recording device 2. When receiving the suspension instruction, the recording device 2 suspends the stream recording. At this time, the recording device 2 does not take the physical block currently under stream-recording as a target for the entrainment saving processing and holds it as it is so that the recording device 2 can continue the stream recording from a suspended position at the time of subsequent resumption of the stream recording. That is, when receiving the suspension instruction, the recording device 2 does not record data into an unrecorded area in the block including the suspended position until receiving from the access device a resumption instruction for recording data with the suspended position taken as a recording start position. Accordingly, even when suspension and resumption of the stream recording are repeated, stream data can be densely stored in the physical block, thereby improving the area use efficiency.

The stream management information 224 stores information about the physical block under stream-recording when the recording device 2 receives the suspension instruction. The stream management number is a serial number of information associated with a block which is managed and under stream-recording. In an example shown in FIG. 5, the stream management information 224 can store N pieces of information. Accordingly, when a plurality of streams are simultaneously being recorded, a plurality of suspended positions can be stored in the recording device 2, thus further enhancing the convenience.

The logical sector number is information indicating a position where stream data is being recorded at the time of suspension of the recording, and indicates a position other than a logical block boundary. In the example shown in FIG.

5, the stream management information 224 indicates that two streams are in a suspended state, and indicates that stream data has been recorded up to respective logical sector numbers 0x4400 and 0x6800. The logical block number is information indicating a position of a logical block including a logical sector number.

Here, in the example shown in FIG. 5, the size of one logical block is defined as 4 MB (0x2000 sector), and the size of one sector is defined as 512 bytes, and hence a logical block number including the logical sector number 0x4400 is 0x0002. Similarly, a logical block number including the logical sector number 0x6800 is 0x0003. The physical block number is information indicating a position of a physical block associated with a logical block number. In the example of FIG. 5, physical block numbers associated with the logical block numbers 0x0002 and 0x0003 are 0x0002 and 0x0003, respectively.

Figure 6:
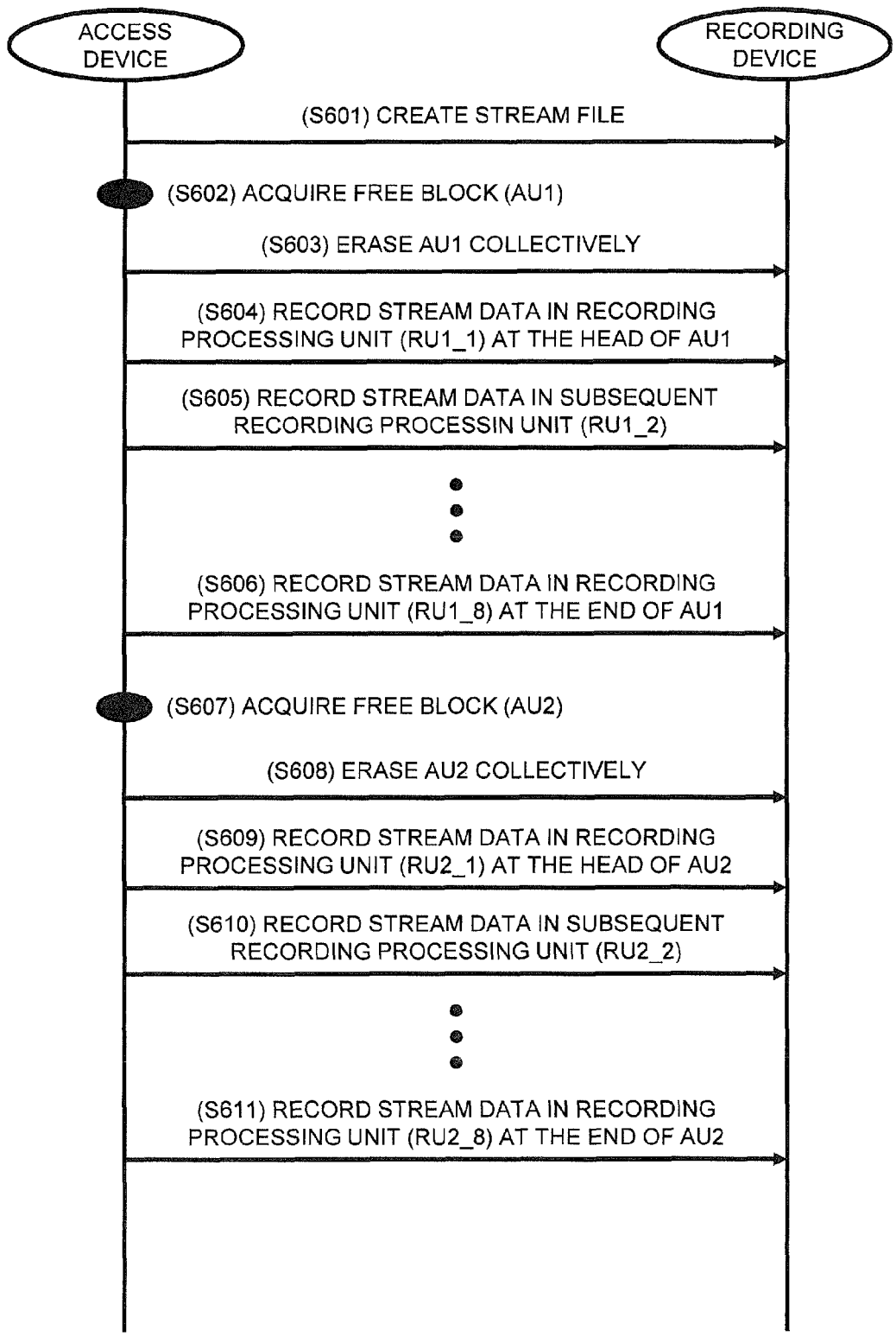
FIG. 6 is a sequence chart showing stream recording processing in the case of non-occurrence of suspension processing in the present embodiment.
Figure 7:
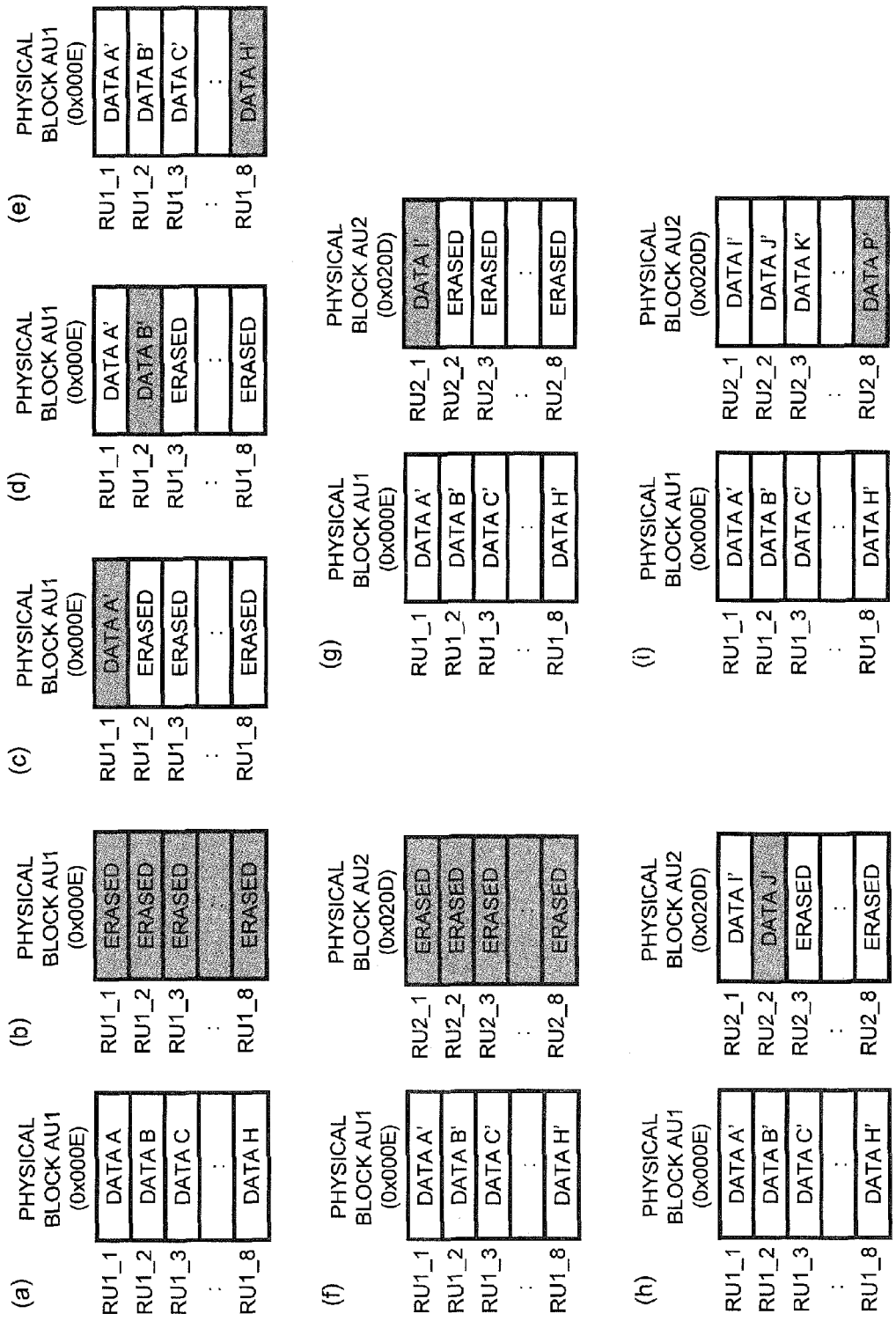
FIG. 7 shows diagrams illustrating states of physical blocks in the present embodiment.

4. Stream Recording Processing in a Case of Non-Occurrence of Suspension Processing in Present Embodiment Next, with reference to FIGS. 6 and 7, a description will be given of the stream recording processing in a case of non-occurrence of the suspension processing in the present embodiment. FIG. 6 is a diagram showing a flow of the stream recording processing in the case of non-occurrence of the suspension processing in the present embodiment. FIG. 7 shows diagrams illustrating states of the physical blocks at each time point in the flow of FIG. 6.

(S601) First, in the file system controller 102 of the access device 1, a stream file is created. Specifically, in order to create a file with a file size of 0 as the stream file on the recording device 2, the file system controller 102 of the access device 1 writes file system management information (information such as a FAT table and a directory entry in the case of a FAT file as one example) into the nonvolatile memory 22 of the recording device 2 via the access unit 103.

(S602) Subsequently, in the first recording controller 104 of the access device 1, a free block is acquired. In the present embodiment, the logical address space, which is divided into fixed-length block units (hereinafter each referred to as "allocation unit" (AU)), is managed, and stream data is recorded into an AU, the inside of which is entirely a free area, except for the time of resumption of the stream recording after its suspension (including start time of recording of another file). For this reason, prior to the stream recording, the first recording controller 104 searches an AU, the inside of which is entirely a free area, as an AU to be allocated for the stream recording, and specifies its position (hereinafter, the AU whose position has been specified in this processing is referred to as AU1). In a case of the file system being the FAT file system as one example, the first recording controller 104 reads the FAT table from the recording device 2, and carries out processing of specifying the AU, the inside of which is entirely a free area, on the FAT table. FIG. 7(a) shows a state of the physical block AU1 (physical block number 0x000E) after the processing of Step S602. The AU1 is managed as a free area on area management information of the file system such as the FAT table. Since the AU1 is in the state of being stored with file data (data A to data H) deleted in the past, data cannot be overwritten in the AU1 if this state remains unchanged.

(S603) Next, the first recording controller 104 collectively erases the data in the AU1 acquired in Step S602. In the recording device 2 of the present embodiment, such as a memory card, which uses a NAND flash memory as a storage device, an erase command for erasing data is provided, in addition to a write command for writing data. In the present processing, the first recording controller 104 carries out processing of issuing an erase command with respect to the area of the AU1. Further, instead of explicitly issuing an erase command, a special command indicating start of the stream data recording into the AU may be transmitted to the recording device 2. When the recording device 2 receives this special command, the recording device 2 carries out collective deletion processing in the recording device 2 as preparation for the stream data recording into the corresponding area. FIG. 7(b) shows a state of the physical block AU1 after the processing of Step S603.

(S604) Next, the access device 1 transmits to the recording device 2 a write command for instructing the recording device 2 to record stream data with the head of the AU1 taken as a start position. In the present embodiment, the stream data is recorded into the recording device 2 in each predetermined recording unit (hereinafter referred to as "recording unit" (RU)). Hence it is possible to ensure, for each write command, a constant amount of stream data to be transmitted to the recording device 2, so as to prevent a recording speed from decreasing due to overhead of issuing the command. In the processing of Step S604, the access device 1 transmits to the recording device 2 a write command for recording data A' into one RU(RU1_1) existing at the head of the AU1. The recording device 2 having received the write command records the data A' into the specified RU(RU1_1). FIG. 7(c) shows a state of the physical block AU1 after the processing of Step S604.

(S605) Subsequently, the access device 1 records stream data into a subsequent area in the AU1. In processing of Step S605, data B' is recorded into RU1_2 of the AU1. FIG. 7(d) shows a state of the physical block AU1 after the processing of Step S605.

(S606) In a similar manner, the access device 1 records stream data into the remaining areas in the AU1. Since the AU 1 is made up of eight RUs, stream data is subsequently recorded to the end of RU1_8. FIG. 7(e) shows a state of the physical block AU1 after the processing of Step S606.

(S607) Next, the first recording controller 104 of the access device 1 acquires another free AU (AU2) as in Step S602.

(S608) Subsequently, the first recording controller 104 collectively erases data in the AU2 as in Step S603. FIG. 7(f) shows states of the physical blocks AU1 and AU2 after the processing of Step S608. The AU1 is in a state where the entire area has already been recorded with the stream data, and the AU2 is in a state where all the areas have already been erased.

(S609) Subsequently, the access device 1 records stream data I' into an area of RU2_1 in the AU2 as in Step S604. FIG. 7(g) shows states of the physical blocks AU1 and AU2 after the processing of Step S609.

(S610) Subsequently, the access device 1 records stream data J' into an area of RU2_2 in the AU2 as in Step S605. FIG. 7(h) shows states of the physical blocks AU1 and AU2 after the processing of Step S610.

(S611) Subsequently, the access device 1 records stream data into the remaining areas in the AU2 as in Step S606. FIG. 7(i) shows states of the physical blocks AU1 and AU2 after the processing of Step S611. By the processing up to here, the AU1 and the AU2 have come into states where stream data are stored in all the areas.

Thereafter, similar processing is repeatedly carried out to record stream data.

Thus, in the present embodiment, as far as the stream recording is not suspended, an AU is newly acquired, data in the acquired AU is collectively erased, and stream data is recorded into the AU. Hence it is possible to reduce the copying processing due to the entrainment saving processing, so as to perform high-speed recording by the recording device at the time of real-time recording.

5. Stream Recording Processing in a Case of Occurrence of Suspension Processing

Figure 8:
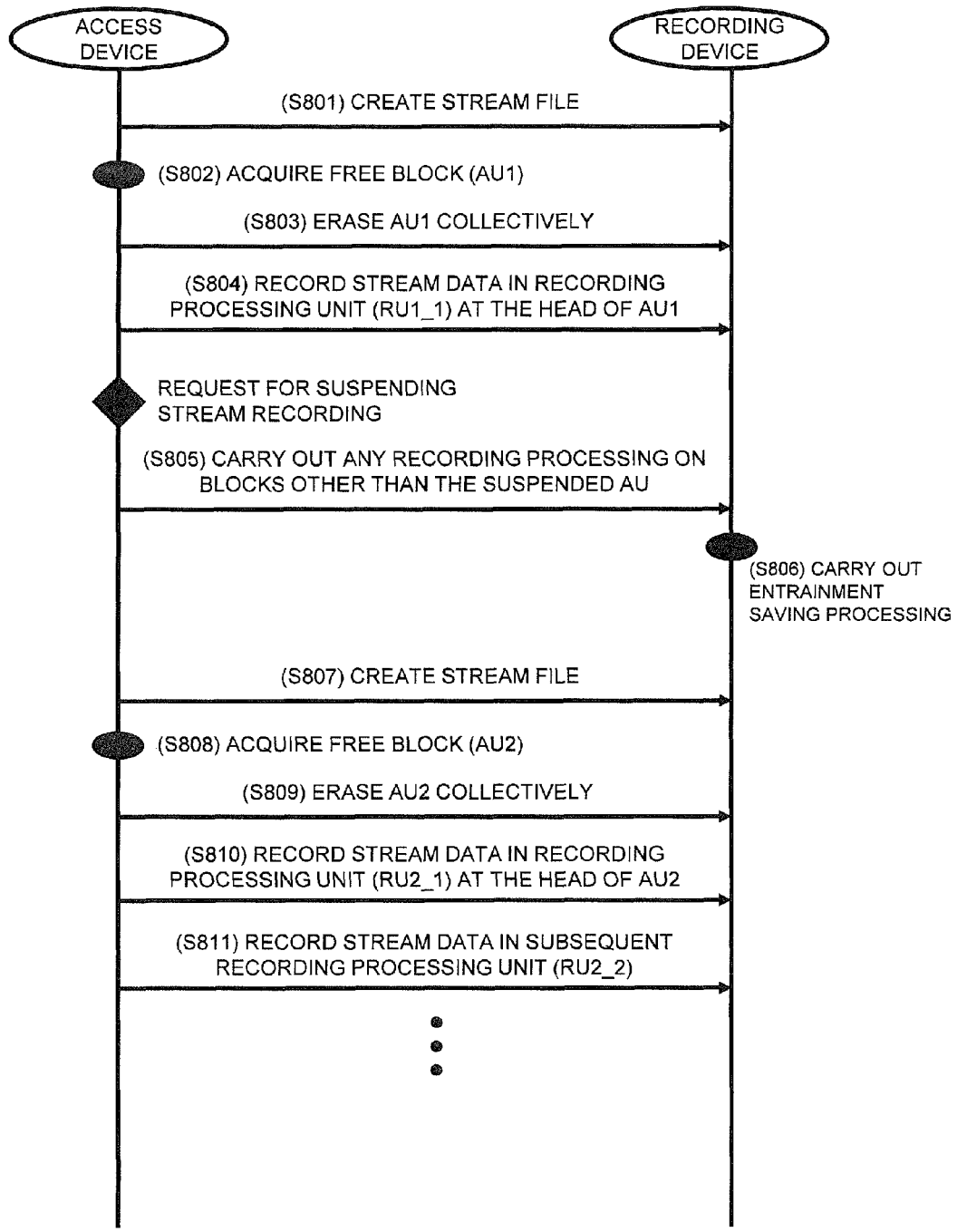
FIG. 8 is a sequence chart showing stream recording processing in the case of occurrence of the suspension processing in the conventional recording device.
Figure 9:
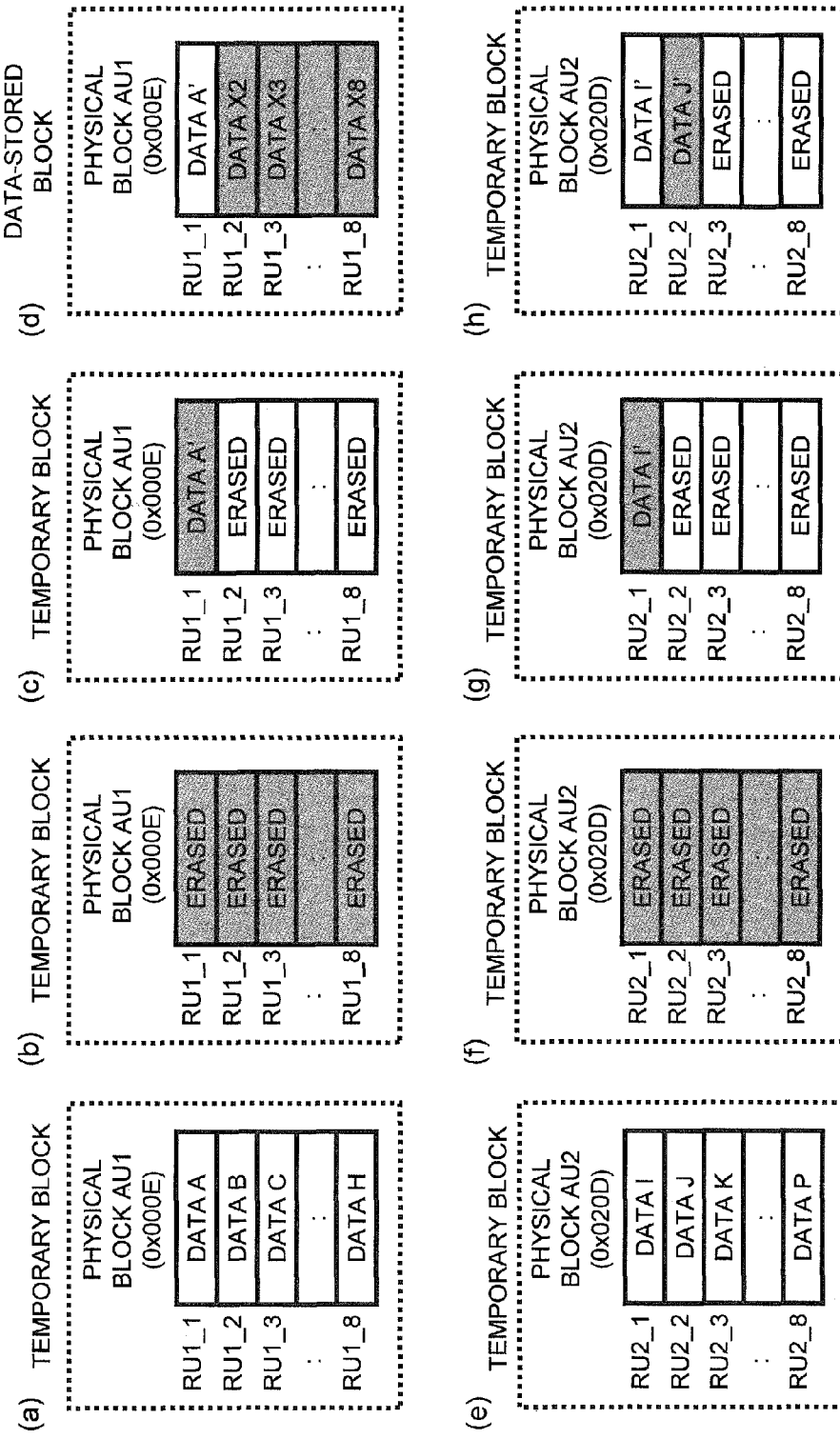
FIG. 9 shows diagrams illustrating states of physical blocks in the conventional recording device.
Figure 10:
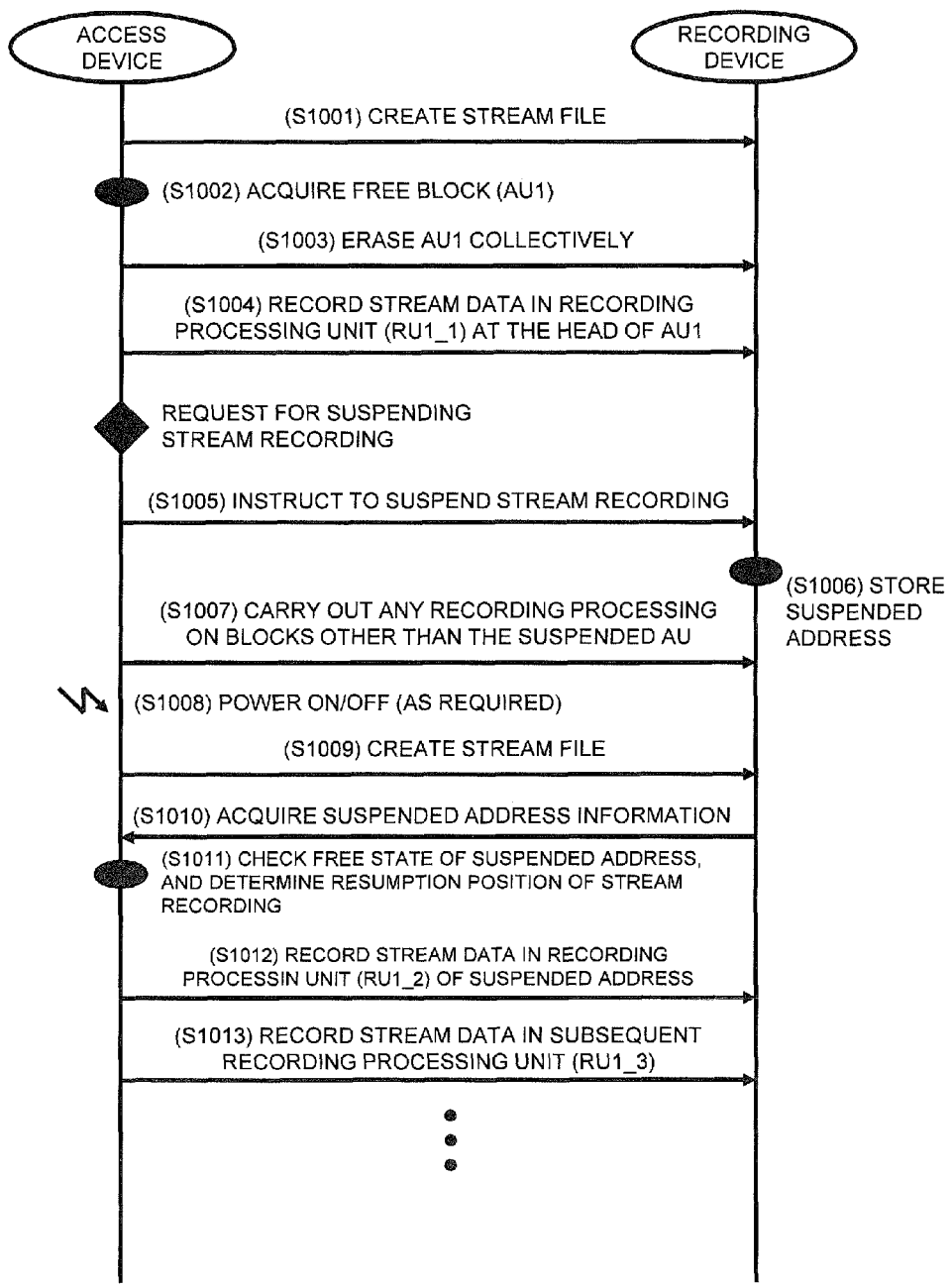
FIG. 10 is a sequence chart showing stream recording processing in the case of occurrence of the suspension processing in the present embodiment.

Next, in order to clarify the difference between the stream recording processing of the present embodiment and the conventional stream recording processing, first, a procedure for the conventional stream recording processing in a case of occurrence of the suspension processing will be described with reference to FIGS. 8 and 9, and thereafter, a procedure for the stream recording processing of the present embodiment in a case of occurrence of the suspension processing will be described with reference to FIGS. 10 and 11. FIGS. 8 and 10 are diagrams each showing a flow of the stream recording processing in the case of occurrence of the suspension processing, and FIGS. 9 and 11 are diagrams showing states of the physical blocks at each time point in each flow.

5-1. Conventional Stream Recording Processing in the Case of Occurrence of Suspension Processing The procedure for the conventional stream recording processing will be described with reference to FIGS. 8 and 9.

(S801 to S804) Since these are the same processing as the stream recording processing (Steps S601 to S604) in the present embodiment shown in FIG. 6, detailed descriptions are omitted. After the processing of Step S804, the physical block AU1 comes into a state of FIG. 9(c).

(S805) In the example shown in FIG. 8, a case is assumed where the stream recording is suspended at a time point of completion of the stream data recording into RU1_1. This corresponds to a case where a recording stop button is pressed by a user when the video recording is being carried out by a movie camera. When the stream recording is suspended, the file system controller 102 of the access device 1 completes the stream data recording, and carries out updating of file system management information (FAT table, directory entry, etc.) concerning the stream file under recording. Specifically, the recording processing is carried out on the file system management information stored in areas other than the AU1 where the stream recording has been suspended.

(S806) When receiving any write command to a block other than the AU under stream-recording, the recording device 2 carries out the entrainment saving processing on the temporary block described in FIG. 3. FIG. 9(d) shows a state of the physical block AU1 after the processing of Step S806. Data X2 to X8 stored in the corresponding RUs in the old data block are copied into RUs (RU1_2 to RU1_8) after the data A' recorded into RU1_1 by the stream data recording. After completion of the entrainment saving processing, the AU1 managed as the temporary block is managed as a data-stored block. Therefore, from this time on, when data writing in the physical block AU1 is to be carried out, it is necessary to allocate again a physical block other than the physical block AU1 as a temporary block as described in FIG. 3, record new data into the temporary block, and copy the old data stored in the physical block AU1 into the temporary block.

(S807) As in Step S801, the file system controller 102 of the access device 1 creates a stream file. This processing is performed for example in a case where the recording start button is pressed again by the user when the video recording is being carried out by the movie camera.

(S808) Next, the file system controller 102 acquires another free AU (AU2) as in Step S802. FIG. 9(e) shows a state of the physical block AU2 after the processing of Step S808.

(S809) Subsequently, the file system controller 102 collectively erases data in the AU2 as in Step S803. FIG. 9(f) shows a state of the physical block AU2 after the processing of Step S809, which is a state where all the areas in the AU2 have been erased.

(S810) Subsequently, the access device 1 records stream data I' into an area of RU2_1 in the AU2 as in Step S804. FIG. 9(g) shows a state of the physical block AU2 after the processing of Step S810.

(S811) Subsequently, the access device 1 records stream data J' into an area of RU2_2 in the AU2. FIG. 9(h) shows a state of the physical block AU2 after the processing of Step S811. Thereafter, the access device 1 carries out the stream data recording processing in a similar manner.

5-2. Stream Recording Processing in a Case of Occurrence of Suspension Processing in Present Embodiment Subsequently, with reference to FIGS. 10 and 11, the stream recording processing in the present embodiment will be described.

(S1001 to S1004) Since these are the same processing as the conventional stream recording processing (Steps S801 to S804) shown in FIG. 8, a detailed description is omitted. After the processing of Step S1004, the physical block AU1 comes into a state of FIG. 11(c).

(S1005) In the example shown in FIG. 10, a case is assumed where the stream recording is suspended at a time point of completion of the stream data recording in RU1_1 in the AU1 as in the example shown in FIG. 8. This corresponds to a case where the recording stop button is pressed by the user when the video recording is being carried out by the movie camera. In the present embodiment, at this point, the first recording controller 104 of the access device 1 issues to the recording device 2 a special command (suspension instruction command) indicating suspension of the stream recording.

(S1006) When receiving the suspension instruction command, the second recording controller 217 of the recording device 2 stops the stream recording. Further, the second recording controller 217 stores, into the stream management information 224, information about the last physical block which is under stream-recording at the point of stopping the recording. That is, the second recording controller 217 stores into the stream management information 224 a logical sector number indicating a recording-suspended position, the number of a logical block including the position, and the number of a physical block corresponding to the logical block. Further, when receiving the suspension instruction command, the second recording controller 217 prohibits recording of the physical block including the recording-suspended position into an unrecorded area (e.g., entrainment saving processing) until receiving a next command for instructing resumption of the recording from the access device 1. Moreover, after suspending the recording, the second recording controller 217 creates suspended address information based on the stream management information 224, and stores the created suspended address information into the nonvolatile memory 22. Here, the suspended address information is information including a suspended address indicating the recording-suspended position, and information that can be referred to by the access device 1. The suspended address is a position corresponding to a logical sector number included in the stream management information 224. In the present embodiment, for example, the suspended address information is stored in a dedicated register, or in part of the existing register. The recording device 2 can transmit the suspended address information to the access device 1 in response to a request from the access device 1. A detail of the suspended address information will be described later.

(S1007) When transmitting the suspension instruction command to the recording device 2, the file system controller 102 of the access device 1 completes the stream data recording, and carries out updating of file system management information (FAT table, directory entry, and the like) about the stream file which has been under recording until that time. Specifically, at this point, the recording processing is carried out on the file system management information stored in an area other than the AU1 where the stream recording has been suspended. Even when the recording processing is carried out on the area other than the AU1 in the present processing, the recording into the unrecorded area in the physical block including the recording-suspended position is prohibited, and hence the recording device 2 in the present embodiment does not carry out the entrainment saving processing on the area of AU1, and holds the area of AU1 as it is. This enables additional writing of stream data into the area subsequent to the AU1 at the time of resumption of the recording which is performed later.

(S1008) Based on the user's instruction (as required), the access device 1 turns on and off the power supply. This is, for example, processing that is performed in a case where, when the video recording is being carried out by the movie camera, the user once turns off the power supply to the movie camera after completing the recording, and then turns on the power supply to the movie camera at the time of starting the recording again. In the present embodiment, even when the power supplies to the access device 1 and the recording device 2 are turned off, since the stream management information 224 is stored in the nonvolatile memory 22, the recording device 2 keeps holding necessary information for carrying out additional writing processing on the AU where the recording has been suspended. Hence it is possible to carry out the additional writing processing on the AU where the recording has been suspended after turning on the power supply following the suspension of the recording.

(S1009) As in Step S1001, the file system controller 102 of the access device 1 creates a stream file. This processing is performed for example in a case where the recording start button is pressed again by the user when the video recording is being carried out by the movie camera.

(S1010) Next, the first recording controller 104 of the access device 1 requests suspended address information from the second recording controller 217 of the recording device 2. In response to the request, the second recording controller 217 of the recording device 2 transmits the suspended address information to the first recording controller 104 of the access device 1 via the second interface 211. Accordingly, the first recording controller 104 of the access device 1 can acquire the suspended address information via the first interface 13.

(S1011) Subsequently, the first recording controller 104 of the access device 1 refers to the suspended address information acquired in Step S1010 and the area management information of the file system, to check a free state in the vicinity of the suspended address and determine a position for resumption of the stream data recording. Here, at the point where the recording device 2 stores the suspended address in the processing of Step S1006, the remaining areas in the AU where the recording has been suspended should be being managed as free areas by the file system. However, for confirmation, the first recording controller 104 again refers to the area management information (FAT table etc.) of the file system, to check whether the remaining areas in the AU where the recording has been suspended are actually being managed as free areas. If the remaining areas in the AU are not being managed as free areas, the first recording controller 104 gives up performing additional writing on the AU indicated by the suspended address information, returns to the processing of Step S1002, newly acquires a free AU, and performs the stream data recording on the acquired AU. When the remaining areas in the AU are being managed as free areas, the access device 1 proceeds to processing of Step S1012.

(S1012) When determining that resumption of the stream recording from the suspended address is possible in the processing of Step S1011, the access device 1 records the stream data with the suspended address (area of RU1_2 in the example of FIG. 10) taken as a start position. At this time, the access device 1 may transmit, to the recording device 2, information indicating that stream data recording is additional writing.

(S1013) Subsequently, the access device 1 records stream data into an area of RU1_3. FIG. 11(d) shows a state of the physical block AU1 after the processing of Step S1013.

Thereafter, the access device 1 carries out the stream data recording processing in a similar manner.

In such a manner, the stream recording processing shown in FIG. 10 is different from the stream recording processing shown in FIG. 8 in that suspension of the stream data recording is instructed from the access device 1 to the recording device 2 at the time of the suspension, and the stream management information 224 is held in the recording device 2. Therefore, in the present embodiment, it is possible to perform additional writing in a subsequent area in the AU where the recording has been suspended at the time of resumption of the suspension. Accordingly, in the present embodiment, it is possible to perform high-speed recording by the recording device 2 on writing of stream data during the real-time recording, and also improve the area use efficiency.

6. Suspended Address Information

With reference to FIG. 12, a detail of the suspended address information in the present embodiment will be described.

In the present embodiment, as described above, the recording device 2 creates suspended address information indicating a recording-suspended position based on the stream management information 224, and stores the created suspended address information into a register space of the nonvolatile memory 22. The recording device 2 transmits the stored suspended address information to the access device 1 in response to a request from the access device 1. Accordingly, the access device 1 can acquire the suspended address information from the recording device 2 as a register.

FIG. 12 shows three kinds of methods for storing the suspended address information into the register. Any of these three kinds of storage methods may be adopted. Further, these three kinds of storage methods may be switched as appropriate. Moreover, a method other than these three kinds may be adopted for the method for storing the suspended address information into the register.

FIG. 12(a) shows suspended address information configured such that all the (i.e., eight) logical sector numbers included in the stream management information 224 are shown to the access device 1 as suspended addresses in the register space (Suspended Address 1 to Suspended Address 8). In the example of FIG. 12(a), a case is assumed where the recording device 2 can hold up to eight logical sector numbers. However, the number of logical sector numbers is one example, and the recording device 2 may be configured so as to hold one or more of any number of logical sector numbers.

FIG. 12(b) shows an example of suspended address information in a case where only one out of the plurality of logical sector numbers included in the stream management information 224 is presented in the register space to the access device 1. In the present example, Target Slot which is the number of a logical sector number currently indicated in the register is also presented to the access device 1. In the case of adopting the suspended address information of the present example, when the logical sector number indicated in the register space is made switchable to another logical sector number by an instruction from the access device 1, the convenience is further enhanced.

FIG. 12(c) is a diagram showing an example of suspended address information in a case where only one out of the plurality of logical sector numbers included in the stream management information 224 is presented to the access device 1 as a suspended address in the register space. Note that, in the present example, differently from the example shown in FIG. 12(b), the number of the logical sector number currently indicated in the register is not presented. In the case of adopting the suspended address information in the present example, for example, the oldest logical sector number out of the plurality of registered logical sector numbers may be indicated in the register, or the newest logical sector number may be indicated in the register. Other than these, a logical sector number with the lowest-numbered address may be indicated in the register. The logical sector number indicated may be determined by any method.

FIG. 13 shows diagrams illustrating one example of suspended address information updating processing in the second recording controller 217 of the recording device 2 in the case of adopting the suspended address information shown in FIG. 12(c). It is to be noted that in the following, a logical sector number indicating a recording-suspended position in the stream management information 224 is also referred to as a suspended address.

In a state of FIG. 13(a), two suspended addresses are registered in the stream management information 224, and one at the head out of the two suspended addresses is indicated in the register. In this state, when the additional writing processing of Step S1012 of FIG. 10 is carried out on the AU indicated by the suspended address, the head suspended address in the stream management information 224 and the logical and physical blocks corresponding to the suspended address are cleared (erased). The register is then updated so as to indicate the next suspended address, and comes into a state of FIG. 13(b). In this state, when the additional writing is further carried out on the AU indicated by the suspended address currently shown in the register, this suspended address is also cleared (erased) from the stream management information 224. Then, a block number (number indicating invalidity, such as 0xFFFFFFFF) indicating non-existence of an AU in the recording-suspended state is indicated in the register. Thereby, when the suspended address information indicated in FIG. 12(c) is adopted, the suspended addresses are sequentially indicated in the register and the access device 1 can sequentially acquire the suspended addresses.

7. Recording Resumption Operation of Access Device and Recording Device

Subsequently, with reference to FIGS. 14 to 17, a description will be given of stream data recording processing in the first recording controller 104 of the access device 1 and stream data recording processing in the second recording controller 217 of the recording device 2, by use of the respective suspended address information of FIGS. 12(a), 12(b) and 12(c). In the description here, a method for determining a stream data recording area and writing of stream data itself are focused, and other processing (updating processing for file system management information, etc.) is omitted.

7-1. Case where all Suspended Addresses are Presented to Access Device

First, a description will be given of stream data recording processing in the access device 1 and the recording device 2 in a case where the suspended address information shown in FIG. 12(a) is adopted.

7-1-1. Operation of Access Device

Hereinafter, with reference to FIG. 14, a description will be given of the stream data recording processing by the first recording controller 104 of the access device 1 in the present example.

(S1401) The first recording controller 104 of the access device 1 collectively acquires all suspended addresses (Suspended Addresses, hereinafter each referred to as "SA") from the recording device 2. When the suspended address information shown in FIG. 12(a) is adopted, since all the SAs are arrayed and stored in the register, the access device 1 can collectively acquire the SAs by reading them from the register.

(S1402) When collectively acquiring the SAs, the first recording controller 104 initializes a counter value i for SA searching to 1.

(S1403) The first recording controller 104 determines whether the counter value i has exceeded the maximum number of registration (the maximum number of registration is "8" in the case of the example shown in FIG. 12(a)). When the counter value i has exceeded the maximum number of registration (YES), the first recording controller 104 proceeds to processing of Step S1408. When the counter value i has not exceeded the maximum number of registration (NO), the first recording controller 104 proceeds to processing of Step S1404.

(S1404) When the counter value i has not exceeded the maximum number of registration, the first recording controller 104 refers to an i-th SA out of the SAs collectively acquired in Step S1401, to determine whether the stored address is a valid address. Here, the valid address is an address existing in the logical address space of the nonvolatile memory 22. When the stored address is a valid address (YES), the first recording controller 104 proceeds to processing of Step S1405, and when the stored address is not a valid address (NO), the first recording controller 104 proceeds to processing of Step S1406.

(S1405) When determining that the stored address is a valid address in the processing of Step S1404, the first recording controller 104 checks, in the logical block including the corresponding SA, whether areas after the SA are all free. This is processing for checking that the areas after the SA are being managed as free areas also on the file system management information (FAT table, etc.) upon recording of stream data into the areas after the SA. When the areas after the SA are free (YES), the first recording controller 104 proceeds to processing of Step S1407, and when the areas after the SA are not free areas (NO), the first recording controller 104 proceeds to processing of Step S1406.

(S1406) When the stored address is not a valid address, the first recording controller 104 adds 1 to the counter value i and returns to the processing of Step S1403.

(S1407) When determining that the areas after the SA are free in the processing of Step S1405, the first recording controller 104 writes stream data in the target logical block with the i-th SA taken as a start position, and proceeds to processing of Step S1409.

(S1408) When determining that the counter value i has exceeded the maximum number of registration in the processing of Step S1403, the first recording controller 104 determines that a logical block likely to be usable for the stream data recording is not found among the SAs included in the suspended address information. Then, the first recording controller 104 newly searches, on the file system management information, a logical block where areas are all free. When finding the logical block where areas are all free, the first recording controller 104 writes stream data into the found logical block.

(S1409) When writing stream data in the logical block, the first recording controller 104 subtracts the size of the written stream data from the size of all the stream data, to determine whether unrecorded stream data remains. When the unrecorded stream data remains (YES), the first recording controller 104 returns to the processing of Step S1401, and when the unrecorded stream data does not remain (NO), the first recording controller 104 completes the stream data recording processing.

Figure 14:
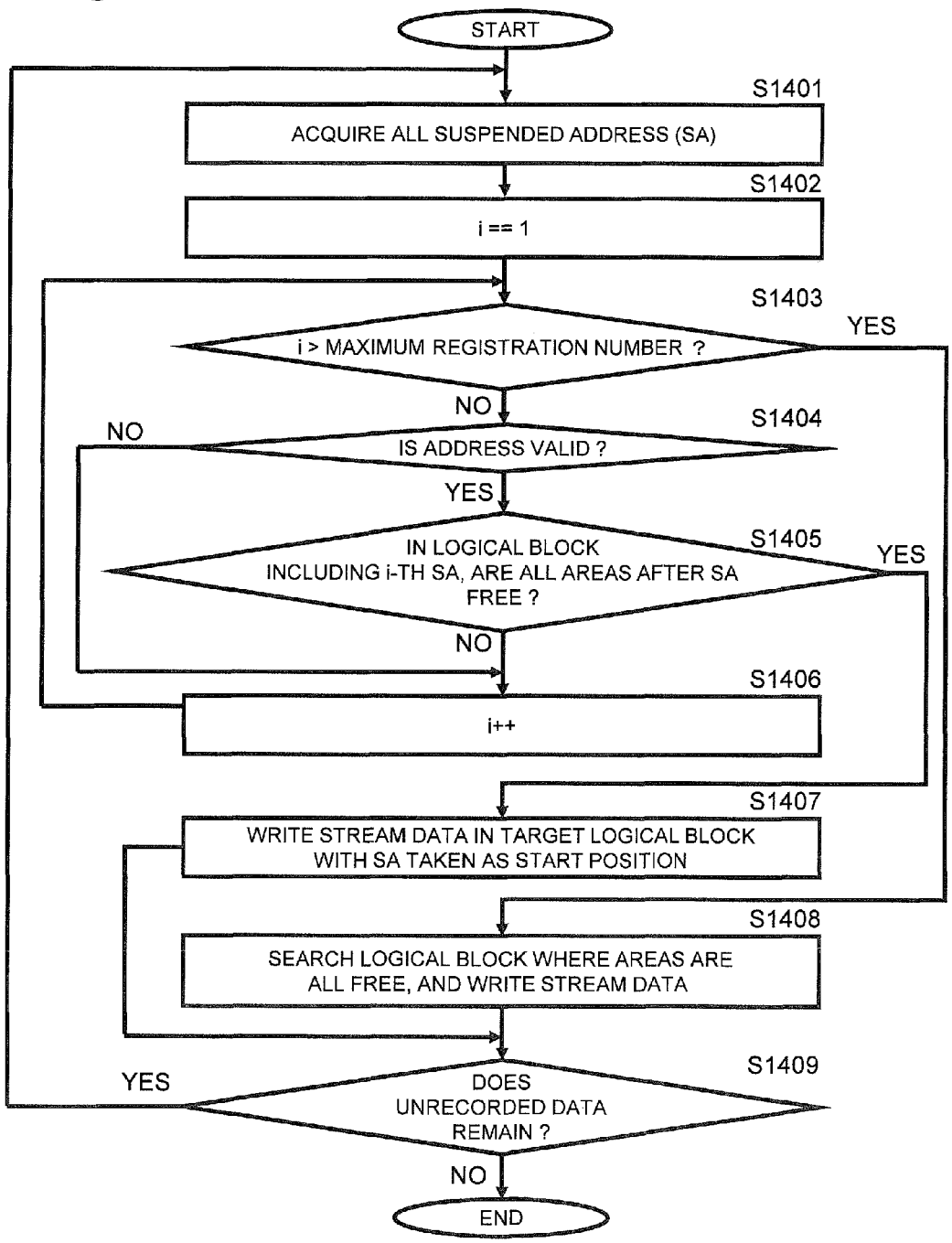
FIG. 14 is a flowchart showing stream data recording processing in a first recording controller in the case of using first suspended address information in the present embodiment.

Thus, in the stream data recording processing shown in FIG. 14, a logical block usable for the stream recording is specified based on the collectively acquired SAs, and when it is found, the stream recording is carried out from the suspended position in the corresponding logical block.

7-1-2. Operation of Recording Device

Hereinafter, with reference to FIG. 15, a description will be given of the stream data recording processing in the second recording controller 217 of the recording device 2 in the case where the suspended address information shown in FIG. 12(a) is adopted.

(S1501) The second recording controller 217 of the recording device 2 determines whether a writing start address notified by the access device 1 as an argument of a write command is equal to any one of the SAs (logical sector numbers) stored in the stream management information 224. When the start address is equal to any one of the SAs in the stream management information 224 (YES), the second recording controller 217 proceeds to processing of Step S1502, and when the start address is not equal to any one of the SAs in the stream management information 224 (NO), the second recording controller 217 proceeds to processing of Step S1505.

(S1502) The second recording controller 217 carries out additional writing processing on the physical block including the corresponding SA determined as being equal to the notified start address in the processing of Step S1501, from the middle area in the physical block. Specifically, data is additionally written in the physical block with the corresponding SA taken as a start position.

(S1503) After additionally writing data, the second recording controller 217 clears (deletes) information about the physical block where the data has been additionally written from the stream management information 224.

(S1504) The second recording controller 217 updates the suspended address information (FIG. 12(a)) including the SAs.

(S1505) When determining that the start address is not equal to any one of the SAs in the stream management information 224 in the processing of Step S1501, the second recording controller 217 determines whether the number of a logical block including the writing start address notified by the access device 1 as the argument of the write command exists in the stream management information 224. When the corresponding logical block number exists in the stream management information 224 (YES), the second recording controller 217 proceeds to processing of Step S1506, and when the corresponding logical block number does not exist in the stream management information 224 (NO), the second recording controller 217 proceeds to processing of Step S1508.

(S1506) When determining that the corresponding logical block number exists in the stream management information 224 in the processing of Step S1505, the second recording controller 217 clears (deletes) information about the corresponding logical block from the stream management information 224.

(S1507) After clearing the information about the corresponding logical block, the second recording controller 217 updates the suspended address information including the SAs (FIG. 12(a)).

(S1508) After updating the suspended address information or when determining that the corresponding logical block number does not exist in the stream management information 224 in the processing of Step S1505, the second recording controller 217 carries out, as required, the entrainment saving processing on the physical block including the writing start address notified by the access device 1 as the argument of the write command, and then carries out the data writing processing.

(S1509) After completing recording of stream data into the physical block including the notified writing start address, the second recording controller 217 subtracts the size of the recorded stream data from the size of all the stream data, to determine whether unrecorded stream data remains. When the unrecorded stream data remains (YES), the second recording controller 217 returns to the processing of Step S1501, and when the unrecorded stream data does not remain (NO), the second recording controller 217 completes the stream data recording processing.

Figure 15:
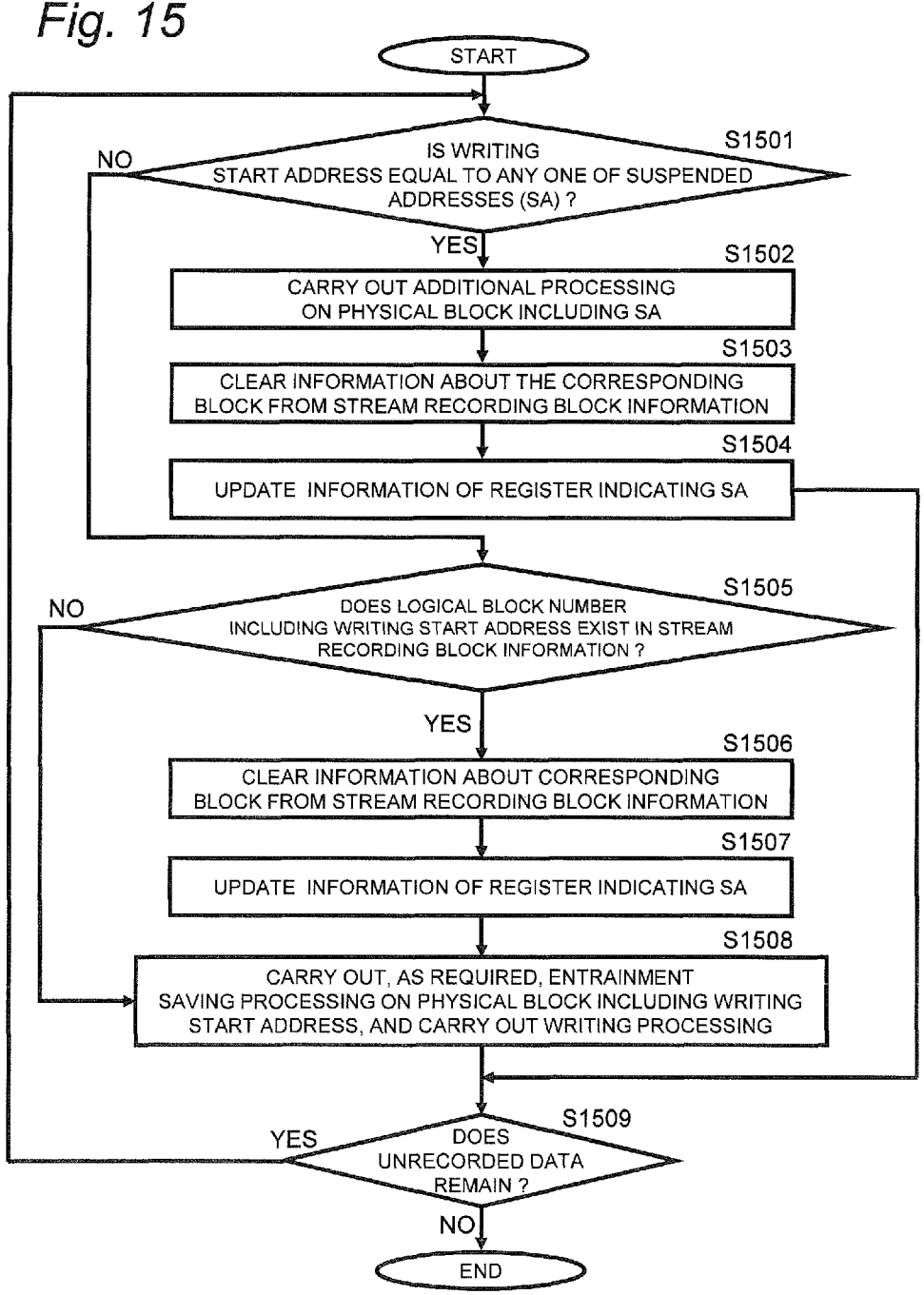
FIG. 15 is a flowchart showing stream data recording processing in the second recording controller in the case of using the first suspended address information in the present embodiment.

Thus, in the stream data recording processing shown in FIG. 15, the recording device 2 determines whether or not an area where the data writing is instructed from the access device 1 is a suspended address. When the instructed area corresponds to a suspended address, the recording device 2 updates the stream management information 224 and the like, and additionally writes stream data in a physical block including the instructed area.

7-2. Operation (1) of Access Device in the Case where Access Device is Presented with Only One Suspended Address Hereinafter, with reference to FIG. 16, a description will be given of the stream data recording processing in the first recording controller 104 of the access device 1 in the case of adopting the suspended address information shown in FIG. 12(b).

(S1601) The first recording controller 104 initializes a counter value (i) for SA searching to 1.

(S1602) Next, the first recording controller 104 determines whether the counter value i has exceeded the maximum number of registration. The maximum number of registration is 8, for example. When the counter value i has exceeded the maximum number of registration (YES), the first recording controller 104 proceeds to processing of Step S1608. When the counter value i has not exceeded the maximum number of registration (NO), the first recording controller 104 proceeds to processing of Step S1603.

(S1603) The access device 1 issues to the recording device 2 a special command for setting Target Slot with the counter value i taken as an argument. With this special command, the recording device 2 is notified of the number of Target Slot to be indicated in the register as the argument. When receiving the command, the recording device 2 changes the SA to be indicated in the register to an SA corresponding to Target Slot specified by the access device 1. That is, the i-th SA comes to be indicated in the register by the processing. The access device 1 refers to the register of the recording device 2, to acquire the SA indicated therein.

(S1604) Next, the first recording controller 104 determines whether an address indicated by the SA acquired in Step S1603 is a valid address. When the SA is a valid address (YES), the first recording controller 104 proceeds to processing of Step S1605, and when the SA is not a valid address (NO), the first recording controller 104 proceeds to processing of Step S1606.

(S1605) When determining that the SA is a valid address in the processing of Step S1604, the first recording controller 104 determines whether areas after the SA are all free in the logical block including the corresponding SA. This is processing for checking that the areas after the SA are being managed as free areas also on the file system management information (FAT table, etc.) upon recording of stream data into the areas after the SA. When the areas after the SA in the logical block are free (YES), the first recording controller 104 proceeds to processing of Step S1607, and when the areas after the SA in the logical block are not free areas (NO), the first recording controller 104 proceeds to processing of Step S1606.

(S1606) When determining that the SA is not a valid address in the processing of Step S1604, or that areas after the SA in the logical block are not free areas in the processing of Step S1605, the first recording controller 104 adds 1 to the counter value i and returns to the processing of Step S1602.

(S1607) When determining that the areas after the SA in the logical block are free in the processing of Step S1605, the first recording controller 104 writes stream data in the target logical block with the SA taken as a start position, and proceeds to processing of Step S1609.

(S1608) When the counter value i has exceeded the maximum number of registration in the processing of Step S1602, the first recording controller 104 determines that a logical block likely to be usable for the stream data recording is not found among the logical sector numbers (suspended addresses) indicating suspended positions stored in the stream management information 224. Then, the first recording controller 104 newly searches a logical block where areas are all free on the file system management information, and when finding the logical block where areas are all free, the first recording controller 104 writes stream data in the found logical block.

(S1609) When completing recording of stream data into the logical block, the first recording controller 104 subtracts the size of the recorded stream data from the size of all the stream data, to determine whether unrecorded stream data remains. When the unrecorded stream data remains (YES), the first recording controller 104 returns to the processing of Step S1601, and when the unrecorded stream data does not remain (NO), the first recording controller 104 completes the stream data recording processing.

Figure 16:
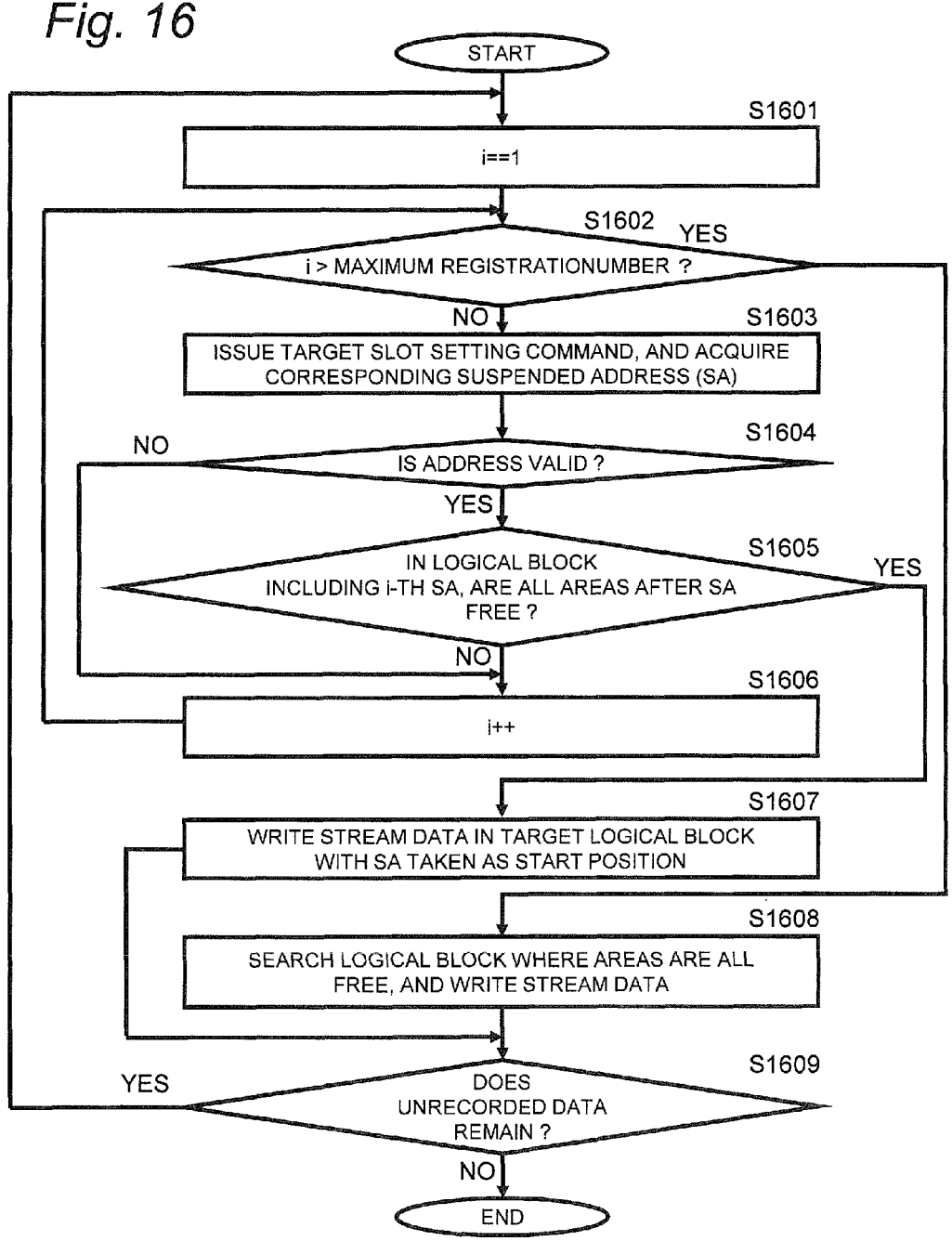
FIG. 16 is a flowchart showing stream data recording processing in the first recording controller in the case of using second suspended address information in the present embodiment.

Thus, in the stream data recording processing shown in FIG. 16, the first recording controller 104 acquires the SA sequentially from the head out of the SAs stored in the stream management information 224 while changing Target Slot, and specifies a logical block usable for the stream recording. When finding the logical block usable for the stream recording, the first recording controller 104 carries out the stream recording from the suspended position (SA) in the corresponding logical block.

It is to be noted that the stream data recording processing in the second recording controller 217 of the recording device 2 in the case of adopting the suspended address information shown in FIG. 12(*b*) is almost the same as the stream data recording processing described in FIG. 15, and hence a description is omitted.

7-3. Operation (2) of Access Device in the Case where Only One Suspended Address is Presented Hereinafter, a description will be given of the stream data recording processing in the first recording controller 104 of the access device 1 in the case of adopting the suspended address information shown in FIG. 12(*c*). The stream data recording processing in the present example will be described using FIG. 17.

(S1701) The first recording controller 104 of the access device 1 refers to the register of the recording device 2, to acquire an SA.

(S1702) The first recording controller 104 determines whether an address indicated by the SA acquired in Step S1701 is a valid address. When the address indicated by the SA is a valid address (YES), the first recording controller 104 proceeds to processing of Step S1703, and when the address indicated by the SA is not a valid address (NO), the first recording controller 104 proceeds to processing of Step S1705.

(S1703) When determining that the address indicated by the SA in the processing of Step S1702 is a valid address, the first recording controller 104 determines whether areas after the SA are all free in the logical block including the determined SA. This is for checking that the areas after the SA are being managed as free areas also on the file system management information (FAT table, etc.) upon recording of stream data into the areas after the SA. When the areas after the SA are all free (YES), the first recording controller 104 proceeds to processing of Step S1704, and when the areas after the SA are not all free (NO), the first recording controller 104 proceeds to processing of Step S1705.

(S1704) The first recording controller 104 writes stream data into the target logical block with the SA, determined as a valid address, taken as a start position and proceeds to processing of Step S1706.

(S1705) Since a logical block likely to be usable for the stream data recording is not found among the SAs stored in the register of the recording device 2, the first recording controller 104 newly searches a logical block having areas being all free on the file system management information. When finding the logical block where areas are all free, the first recording controller 104 writes stream data in the corresponding logical block.

(S1706) When completing recording of stream data into the logical block, the first recording controller 104 subtracts the size of the recorded stream data from the size of all the stream data, to determine whether unrecorded stream data remains. When the unrecorded stream data remains (YES), the first recording controller 104 returns to the processing of Step S1701, and when the unrecorded stream data does not remain (NO), the first recording controller 104 completes the stream data recording processing.

Thus, in the stream data recording processing of FIG. 17, it is determined whether or not the SA indicated in the register of the recording device 2 is a logical block usable for the stream recording. When the SA is usable for the stream recording, the stream recording is carried out from the suspended position in the corresponding logical block.

It is to be noted that the stream data recording processing in the second recording controller 217 of the recording device 2 in the case of adopting the suspended address information shown in FIG. 12(c) is almost the same as the stream data recording processing described in FIG. 15, and hence a description is omitted.

As described above, by using the access device 1 and the recording device 2 of the present embodiment in combination and notifying, by the access device 1, the recording device 2 of suspension timing for the stream recording, the stream data recording can be resumed from a suspended position. Hence it is possible to perform high-speed recording by the recording device 2 during the real-time recording, and also improve the area use efficiency.

8. Summary of Present Embodiment

As described above, the recording device 2 of the present embodiment operates in accordance with an instruction from the access device 1. The recording device 2 is provided with the nonvolatile memory 22 that stores data, the second interface 211 that receives an instruction issued by the access device 1, and the second recording controller 217 that controls the nonvolatile memory 22. When the second recording controller 217 receives from the access device 1 a recording instruction for recording data into the nonvolatile memory 22, the second recording controller 217 starts recording of data into the nonvolatile memory 22. When a suspension instruction for suspending the recording of data is received from the access device 1, the second recording controller 217 stores suspension information into the nonvolatile memory 22, the suspension information indicating a suspended position as a position in a recording area of the nonvolatile memory 22 at which the data is being recorded upon reception of the suspension instruction.

Further, the access device 1 of the present embodiment accesses the recording device 2 including the nonvolatile memory 22 that stores data. The access device 1 is provided with: the first recording controller 104 that manages an area in the nonvolatile memory 22 with the area divided into predetermined block length units, searches an unrecorded area in the nonvolatile memory 22 in the predetermined block length units, and records data into the unrecorded block; and a first interface that transmits/receives data between the access device 1 and the recording device 2. The first recording controller 104 transmits to the recording device a recording instruction for recording data into the nonvolatile memory 22 when recording data into the unrecorded block, and transmits to the recording device a suspension instruction for instructing suspension of the recording of data, when suspending the recording of data in the middle of the unrecorded block.

When suspending recording of data into the nonvolatile memory 22, the access device 1 and the recording device 2 which have the above configuration store in the nonvolatile memory 22 a position in the nonvolatile memory 22 at which the data is being recorded upon the suspension. Hence it is possible to record data into the nonvolatile memory 22 with the suspended position taken as a start position at the time of resumption of the data recording, thereby improving the area use efficiency.

Further, the access device 1 searches an unrecorded area in the nonvolatile memory 22 in the predetermined block length units, and when finding an unrecorded area, the access device 1 records data into the block. Hence it is possible to perform high-speed recording by the recording device 2 during the real-time recording.

9. Other Embodiments

Although the embodiment of the present disclosure has been described above, the idea of the present disclosure is not restricted to the above embodiment. The embodiment can be modified in a range not deviating from the gist of the present disclosure. Hereinafter, a description will be given of other embodiments, to which the idea of the present disclosure is applicable.

Each of the variety of values described in the above embodiment is one example, and another value may be used. For example, each of the values of the physical block size and page size described in the above embodiment is one example, and not restricted to the above values.

Further, although the configuration of the controller 21 of the recording device 2 has been described with reference to FIG. 1 in the above embodiment, the controller 21 may have another configuration. For example, the CPU 212, the RAM 213 and the like in the controller 21 may be disposed outside the controller 21, or otherwise, other component(s) may be included in the controller 21.

Further, there has been described the example in the above embodiment where the address management information 221 stored in the nonvolatile memory 22 of the recording device 2 is made up of the address conversion information 222, the free block information 223 and the stream management information 224. However, this configuration of the address management information 221 is one example, and the address management information 221 may have another configuration so long as being capable of realizing similar address management. For example, the address conversion information 222 may not be realized as a unitary management table, but may have such a configuration as to disperse and store data into the redundant parts in the respective pages. Alternatively, it may have such a configuration as to integrally manage the address conversion information 222 and the free block information 223 by means of one table.

Further, in the above embodiment, the number of nonvolatile memories 22 used in the recording device 2 is not necessarily one, but a plurality of nonvolatile memories 22 may be used in combination. Especially when it is configured such that data can be written in the plurality of nonvolatile memories 22 in parallel, the writing processing can be performed at a faster speed. In this case, the management unit described as the AU in the above embodiment may be realized by bundling a plurality of physical blocks and regarding them as one AU.

Further, in the stream management information 224 described in FIG. 5, the valid suspended addresses are densely stored in the rows of the stream management numbers 1 and 2, in order from the first row. However, the valid suspended addresses may not necessarily be densely managed in order from the first row to the last row. For example, a valid suspended address may be stored at any position. Further, the logical block number and the physical block number of the stream management information 224 may not necessarily be included in the stream management information 224. This is because the logical block number and the physical block number can be derived from the logical sector number. When information similar to the logical block number and the physical block number can be managed in a form other than the logical sector number, the information may be stored in the form other than the logical sector number.

Further, in FIG. 12(c), there has been described the example where only any one suspended address out of a plurality of registered suspended addresses is indicated in the register (i.e., the example where only one suspended address is included in the suspended address information). In this case, since the access device 1 has no way to find SAs other than the SA indicated in the register, it may not be able to effectively use the other SAs. Accordingly, the access device 1 and the recording device 2 may have such a configuration that an instruction for clearing the SA currently on indicated can be issued by the access device 1 to the recording device 2. This makes the use of the suspended address information in the example of FIG. 12(c) more effective. With this configuration, even when the SA currently on indicated cannot be used for the stream recording for some reason, the access device 1 can acquire a next SA via the register by issuing an instruction for clearing the SA.

Further, not only in the example shown in FIG. 12(c), but also in the case of adopting one of the suspended address information shown in FIG. 12(a) and the suspended address information shown in FIG. 12(b), it may be made possible to clear part or the whole of the registered suspended addresses by an instruction from the access device 1.

Further, in the example of the stream data recording shown in FIG. 10, it has been described that the idea of the present disclosure is adopted to the case where, after completion of recording of one stream file, a next stream file is recorded. However, the idea of the present disclosure is not restricted to the case of using two stream files, but the idea of the present disclosure may also be adopted to a case where recording is suspended and resumed within one stream file.

In the above, the embodiment has been described as an exemplification of the technique in the present disclosure. For this, the detailed descriptions and accompanying drawings have been disclosed. Hence constituents not essential for solving the problems may be included in the constituents described in the detailed descriptions and the accompanying drawings. Accordingly, those nonessential constituents should not be immediately recognized as essential from the fact that those nonessential constituents are described in the detailed descriptions and the accompanying drawings.

Further, the above embodiment is for illustrating the technique of the present disclosure. Therefore, in the above embodiment, a variety of modifications, replacement, addition and/or omission and the like may be performed within the scope of the claims or equivalents thereof.

INDUSTRIAL APPLICABILITY

The idea of the present disclosure is a technique available in an access device that performs real-time recording, such as a movie camera or a DSC, and a recording device that is used in combination with the access device as a recording medium of the access device, such as a memory card.

The invention claimed is:

1. A recording device that operates in accordance with an instruction from an access device, comprising:
    a NAND nonvolatile memory that includes a plurality of blocks each having a plurality of recording units in a recording area, and stores data by the recording unit;
    a communication unit that receives an instruction issued by the access device; and
    a memory controller that controls the NAND nonvolatile memory,
    wherein,
    when a recording instruction for recording data into the NAND nonvolatile memory is received from the access device, the memory controller starts recording of data into the NAND nonvolatile memory
    when a suspension instruction for suspending the recording of data is received from the access device at a time when the memory controller completes the recording of data for the recording unit,
    the memory controller
    stores suspension information indicating a suspended position as a position in the recording area of the NAND nonvolatile memory at which the data is being recorded upon reception of the suspension instruction, and
    holds a block corresponding to the suspended position as is a state at the reception of the suspension instruction, until receiving a resumption instruction for recording data from the access device, and
    when he resumption instruction is received from the access device, the memory controller records data to an unrecorded recording unit in the block being recorded based on the suspension information.

2. The recording device according to claim 1, wherein the communication unit transmits the suspension information to the access device.

3. The recording device according to claim 1, wherein
    the NAND nonvolatile memory includes blocks each having a predetermined size for storing data, and
    when the communication unit receives from the access device a recording instruction for instructing recording of data into an unrecorded area in a block including the suspended position, the memory controller deletes the suspension information indicating the suspended position.

4. The recording device according to claim 1, wherein the suspension information includes a logical address.

5. A recording system comprising:
    a recording device that includes a NAND nonvolatile memory that includes a plurality of blocks each having a plurality of recording units in a recording area, and stores data by the recording unit; and
    an access device that accesses the nonvolatile memory, wherein
    the access device includes
    a recording controller that manages the block, and records data into the block, and
    a first communication unit that transmits/receives data to/from the recording device,
    the recording device includes
    a second communication unit that receives an instruction issued by the access device, and
    a memory controller that controls the NAND nonvolatile memory
    the recording device records data by the recording unit in the NAND nonvolatile memory,
    in a state of completion of recording data to the recording unit, the recording controller of the access device transmits to the recording device a recording instruction for recording data into the NAND nonvolatile memory, when recording data into the block, the recording controller of the access device transmits to the recording device a suspension instruction for instructing suspension of the recording of data, when suspending the recording of data in the middle of the unrecorded block, when the memory controller of the recording device receives the recording instruction from the access device, the memory controller of the recording device starts recording of data into the NAND nonvolatile memory, and when the suspension instruction is received from the access device, the memory controller of the recording device stores suspension information, the suspension information indicating a suspended position as a position in a recording area of the NAND nonvolatile memory at which the data is being recorded upon reception of the suspension instruction, and holds a block corresponding to the suspended position as is a state at the reception of the suspension instruction, until receiving a resumption instruction for recording data from the access device, and when the resumption instruction is received from the access device, the memory controller records data to an unrecorded recording unit in the block being recorded based on the suspension information.

6. A recording method where, in a recording system having a recording device that includes a NAND nonvolatile memory including a plurality of blocks each having a plurality of recording units in a recording area for storing data and an access device that accesses the NAND nonvolatile memory, the access device records data into the NAND nonvolatile memory, the method comprising:

by the access device,
managing the block in the NAND nonvolatile memory, and recording data into the block, and
transmitting/receiving data from/to the recording device,
by the recording device,
receiving an instruction issued by the access device, and controlling the NAND nonvolatile memory,
further by the access device,
transmitting to the recording device a recording instruction for recording data into the NAND nonvolatile memory, when recording data into the unrecorded block, and
transmitting to the recording device a suspension instruction for instructing suspension of the recording of data, when suspending the recording of data in the middle of the unrecorded block, wherein the controlling and the NAND nonvolatile memory controller comprises starting recording of data into the NAND nonvolatile memory when receiving the recording instruction from the access device, the data being recorded by recording unit in the NAND nonvolatile memory, and storing suspension information when the suspension instruction from the access device is received at a time when the memory controller completes the recording of data for the recording unit, the suspension information indicating a suspended position as a position in a recording area of the NAND nonvolatile memory at which the data is being recorded upon reception of the suspension instruction, holding a block corresponding to the suspended position as is a state at the reception of the suspension instruction, until receiving a resumption instruction for recording data from the access device, and recording data to an unrecorded recording unit in the block being recorded based on the suspension information upon receiving the resumption instruction from the access device.

* * * * *